US012532334B2

(12) United States Patent
Abedini et al.

(10) Patent No.: US 12,532,334 B2
(45) Date of Patent: Jan. 20, 2026

(54) MOBILE INTEGRATED ACCESS AND BACKHAUL CONNECTIVITY

(71) Applicant: QUALCOMM Incorporated, San Diego, CA (US)

(72) Inventors: Navid Abedini, Basking Ridge, NJ (US); Naeem Akl, Bridgewater, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 18/052,818

(22) Filed: Nov. 4, 2022

(65) Prior Publication Data

US 2024/0155653 A1   May 9, 2024

(51) Int. Cl.
*H04W 72/40* (2023.01)
*H04W 84/04* (2009.01)

(52) U.S. Cl.
CPC .......... *H04W 72/40* (2023.01); *H04W 84/047* (2013.01)

(58) Field of Classification Search
CPC ............... H04W 72/40; H04W 52/367; H04W 84/047; H04L 1/0025
See application file for complete search history.

(56) References Cited

U.S. PATENT DOCUMENTS

| 2020/0100124 A1 | 3/2020 | Hampel et al. | |
| 2021/0014706 A1* | 1/2021 | Cui | H04L 43/20 |
| 2022/0053588 A1* | 2/2022 | Shaheen | H04W 40/22 |
| 2022/0132337 A1* | 4/2022 | Muhammad | H04W 76/19 |
| 2022/0174579 A1* | 6/2022 | Zhuo | H04L 69/22 |
| 2023/0224072 A1* | 7/2023 | Akl | H04W 52/367 370/329 |

(Continued)

FOREIGN PATENT DOCUMENTS

| CN | 116711379 A * | 9/2023 | |
| EP | 4017210 A1 | 6/2022 | |
| EP | 4344304 A1 * | 3/2024 | H04L 45/745 |
| WO | WO-2023004228 A1 * | 1/2023 | H04L 41/12 |

OTHER PUBLICATIONS

Google Translation of CN116711379 (Year: 2023).*

(Continued)

*Primary Examiner* — Kenny S Lin
(74) *Attorney, Agent, or Firm* — Holland & Hart LLP

(57) ABSTRACT

Methods, systems, and devices for wireless communication are described. A mobile wireless node (e.g., a mobile integrated access and backhaul (IAB) node) may transmit a control message to a parent wireless node indicating one or more supported network connectivity modes. A network connectivity mode may provide network connectivity to one or more user equipments (UEs) via the mobile wireless node when wireless backhaul connectivity is lost between the mobile wireless node and the parent wireless node. The parent wireless node may authorize the mobile wireless node to use a first network connectivity mode, and the mobile wireless node may communicate with a first UE in accordance with the first network connectivity mode. In this way, the mobile wireless node may use a network connectivity mode to extend coverage of a network to the first UE even if the first UE is outside of the coverage area of the network.

30 Claims, 20 Drawing Sheets

(56) References Cited

U.S. PATENT DOCUMENTS

| | | | |
|---|---|---|---|
| 2023/0284204 A1* | 9/2023 | Akl | H04W 72/0446 |
| | | | 370/329 |
| 2023/0388884 A1* | 11/2023 | Freda | H04W 36/0085 |
| 2023/0397084 A1* | 12/2023 | Shah | H04W 40/12 |
| 2023/0413149 A1* | 12/2023 | Teyeb | H04W 36/30 |
| 2024/0049000 A1* | 2/2024 | Vangala | H04W 24/02 |
| 2024/0056940 A1* | 2/2024 | Lagrange | H04W 40/22 |
| 2024/0179543 A1* | 5/2024 | Fujishiro | H04W 16/26 |
| 2024/0388409 A1* | 11/2024 | Teyeb | H04B 17/318 |

OTHER PUBLICATIONS

AT&T: "Authorization for NR Network-controlled Repeaters", 3GPP TSG-RAN WG3 #117bis-e, R3-225759, 3rd Generation Partnership Project, Mobile Competence Centre, 650, Route Des Lucioles, F-06921 Sophia-Antipolis Cedex, France, vol. RAN WG3, No. Oct. 10, 2022-Oct. 18, 2022, Sep. 28, 2022, 3 Pages, XP052278415, section 2.

International Search Report and Written Opinion—PCT/US2023/031386—ISA/EPO—Dec. 22, 2023.

ZTE: "Discussion on IAB Node Discovery and Selection", 3GPP TSG-RAN WG2 NR Ad Hoc 1807, R3-183689, 3rd Generation Partnership Project, Mobile Competence Centre, 650, Route Des Lucioles, F-06921 Sophia-Antipolis Cedex, France, vol. RAN WG2, No. Montreal, Canada, Jul. 2, 2018-Jul. 6, 2018, Jul. 1, 2018, XP051467977, 4 Pages, paragraph [02.2], section 2.2 section 2.2.1.

* cited by examiner

MOBILE INTEGRATED ACCESS AND BACKHAUL CONNECTIVITY

FIELD OF TECHNOLOGY

The following relates to wireless communication, including mobile integrated access and backhaul (IAB) connectivity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless backhaul connectivity between a mobile integrated access and backhaul (IAB) node and a parent IAB node may support functionality of the mobile IAB node. In some cases, however, the wireless backhaul connectivity may be lost.

SUMMARY

The described techniques relate to improved methods, systems, devices, and apparatuses that support mobile integrated access and backhaul (IAB) connectivity. For example, the described techniques provide for extended backhaul connectivity for mobile IAB nodes. A mobile IAB node, such as a vehicle-mounted IAB node, may support multiple network connectivity modes. For example, the mobile IAB node may support IAB operations, non-IAB relay operations, repeater operations, UE relaying, or the like. The mobile IAB node may transmit a control message to a parent IAB node indicating the multiple supported network connectivity modes. Each network connectivity mode may provide network connectivity to one or more UEs via the mobile IAB node when a wireless backhaul connection (e.g., between the mobile IAB node and the parent IAB node) is lost. The parent IAB node may transmit a reply message authorizing the mobile IAB node to use a first network connectivity node, and the mobile IAB node may communicate with a UE in accordance with the first network connectivity mode. As such, the mobile IAB node may communicate with a UE using a particular supported network connectivity node when a wireless backhaul connection is lost.

A method for wireless communication by a mobile wireless node is described. The method may include transmitting, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node, receiving, from the parent wireless node, a reply message indicating authorization to use at least a first network connectivity mode of the one or more network connectivity modes, and communicating one or more messages with a first UE of the one or more UEs in accordance with the first network connectivity mode.

An apparatus for wireless communication by a mobile wireless node is described. The apparatus may include a processor, memory coupled with the processor, and instructions stored in the memory. The instructions may be executable by the processor to cause the apparatus to transmit, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node, receive, from the parent wireless node, a reply message indicating authorization to use at least a first network connectivity mode of the one or more network connectivity modes, and communicate one or more messages with a first UE of the one or more UEs in accordance with the first network connectivity mode.

Another apparatus for wireless communication by a mobile wireless node is described. The apparatus may include means for transmitting, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node, means for receiving, from the parent wireless node, a reply message indicating authorization to use at least a first network connectivity mode of the one or more network connectivity modes, and means for communicating one or more messages with a first UE of the one or more UEs in accordance with the first network connectivity mode.

A non-transitory computer-readable medium storing code for wireless communication by a mobile wireless node is described. The code may include instructions executable by a processor to transmit, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node, receive, from the parent wireless node, a reply message indicating authorization to use at least a first network connectivity mode of the one or more network connectivity modes, and communicate one or more messages with a first UE of the one or more UEs in accordance with the first network connectivity mode.

Some examples of the method, apparatuses, and non-transitory computer-readable medium described herein may further include operations, features, means, or instructions for transmitting, to the one or more UEs, an indication of the first network connectivity mode.

Some examples of the method, apparatuses, and non-transitory computer-readable medium described herein may further include operations, features, means, or instructions for transmitting, to the parent wireless node, an indication that the mobile wireless node may be operating using the first network connectivity mode for communication with the first UE.

Some examples of the method, apparatuses, and non-transitory computer-readable medium described herein may further include operations, features, means, or instructions for transmitting, to the parent wireless node, a request to change between operating using the first network connectivity mode to a second network connectivity mode of the one or more network connectivity modes and receiving, from the parent wireless node, an indication to change between operating using the first network connectivity mode to the second network connectivity mode.

Some examples of the method, apparatuses, and non-transitory computer-readable medium described herein may further include operations, features, means, or instructions for receiving, from the parent wireless node, the reply message indicating authorization to use a second network connectivity mode of the one or more network connectivity modes and indicating at least one criterion for changing between operating using the first network connectivity mode and the second network connectivity mode.

Some examples of the method, apparatuses, and non-transitory computer-readable medium described herein may further include operations, features, means, or instructions for transmitting, to the one or more UEs, an indication of a change between operating using the first network connectivity mode to a second network connectivity mode.

Some examples of the method, apparatuses, and non-transitory computer-readable medium described herein may further include operations, features, means, or instructions for receiving a capability message indicating that the first UE supports sidelink communication and transmitting an indication of a sidelink configuration for the first network connectivity mode.

Some examples of the method, apparatuses, and non-transitory computer-readable medium described herein may further include operations, features, means, or instructions for receiving, from the parent wireless node, a first grant scheduling transmission of a message to the mobile wireless node, the message associated with the first UE, receiving the message based on the first grant, transmitting a second grant scheduling transmission of the message to the first UE, and transmitting, to the first UE, the message based on the second grant.

Some examples of the method, apparatuses, and non-transitory computer-readable medium described herein may further include operations, features, means, or instructions for receiving, from the parent wireless node, a grant scheduling transmission of a message to the mobile wireless node, the message associated with the first UE and relaying the message to the first UE based on the grant.

Some examples of the method, apparatuses, and non-transitory computer-readable medium described herein may further include operations, features, means, or instructions for communicating with the first UE using the first network connectivity mode, where the first network connectivity mode may be selected based on a capability of the first UE, a quality of service (QoS) metric, a radio resource management (RRM) measurement, an interference measurement, or any combination thereof.

A method for wireless communication by a parent wireless node is described. The method may include receiving, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node and transmitting, to the mobile wireless node, a reply message indicating authorization to use at least a first network connectivity mode of the one or more network connectivity modes.

An apparatus for wireless communication by a parent wireless node is described. The apparatus may include a processor, memory coupled with the processor, and instructions stored in the memory. The instructions may be executable by the processor to cause the apparatus to receive, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node and transmit, to the mobile wireless node, a reply message indicating authorization to use at least a first network connectivity mode of the one or more network connectivity modes.

Another apparatus for wireless communication by a parent wireless node is described. The apparatus may include means for receiving, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node and means for transmitting, to the mobile wireless node, a reply message indicating authorization to use at least a first network connectivity mode of the one or more network connectivity modes.

A non-transitory computer-readable medium storing code for wireless communication by a parent wireless node is described. The code may include instructions executable by a processor to receive, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node and transmit, to the mobile wireless node, a reply message indicating authorization to use at least a first network connectivity mode of the one or more network connectivity modes.

Some examples of the method, apparatuses, and non-transitory computer-readable medium described herein may further include operations, features, means, or instructions for receiving, from the mobile wireless node, an indication that the mobile wireless node may be operating using the first network connectivity mode for communication with a first UE.

Some examples of the method, apparatuses, and non-transitory computer-readable medium described herein may further include operations, features, means, or instructions for receiving, from the mobile wireless node, a request to change between operating using the first network connectivity mode to a second network connectivity mode of the one or more network connectivity modes and transmitting, to the mobile wireless node, an indication to change between operation using the first network connectivity mode to the second network connectivity mode.

Some examples of the method, apparatuses, and non-transitory computer-readable medium described herein may further include operations, features, means, or instructions for transmitting, to the mobile wireless node, the reply message indicating authorization to use a second network connectivity mode of the one or more network connectivity modes and indicating at least one criterion for changing between operating using the first network connectivity mode and the second network connectivity mode.

Some examples of the method, apparatuses, and non-transitory computer-readable medium described herein may further include operations, features, means, or instructions for transmitting, to the mobile wireless node, a first grant scheduling transmission of a message to the mobile wireless node, the message associated with a first UE and transmitting the message based on the first grant.

Some examples of the method, apparatuses, and non-transitory computer-readable medium described herein may further include operations, features, means, or instructions for transmitting, to the mobile wireless node, a grant scheduling transmission of a message to the mobile wireless node, the message associated with a first UE.

DETAILED DESCRIPTION

Figure 1:
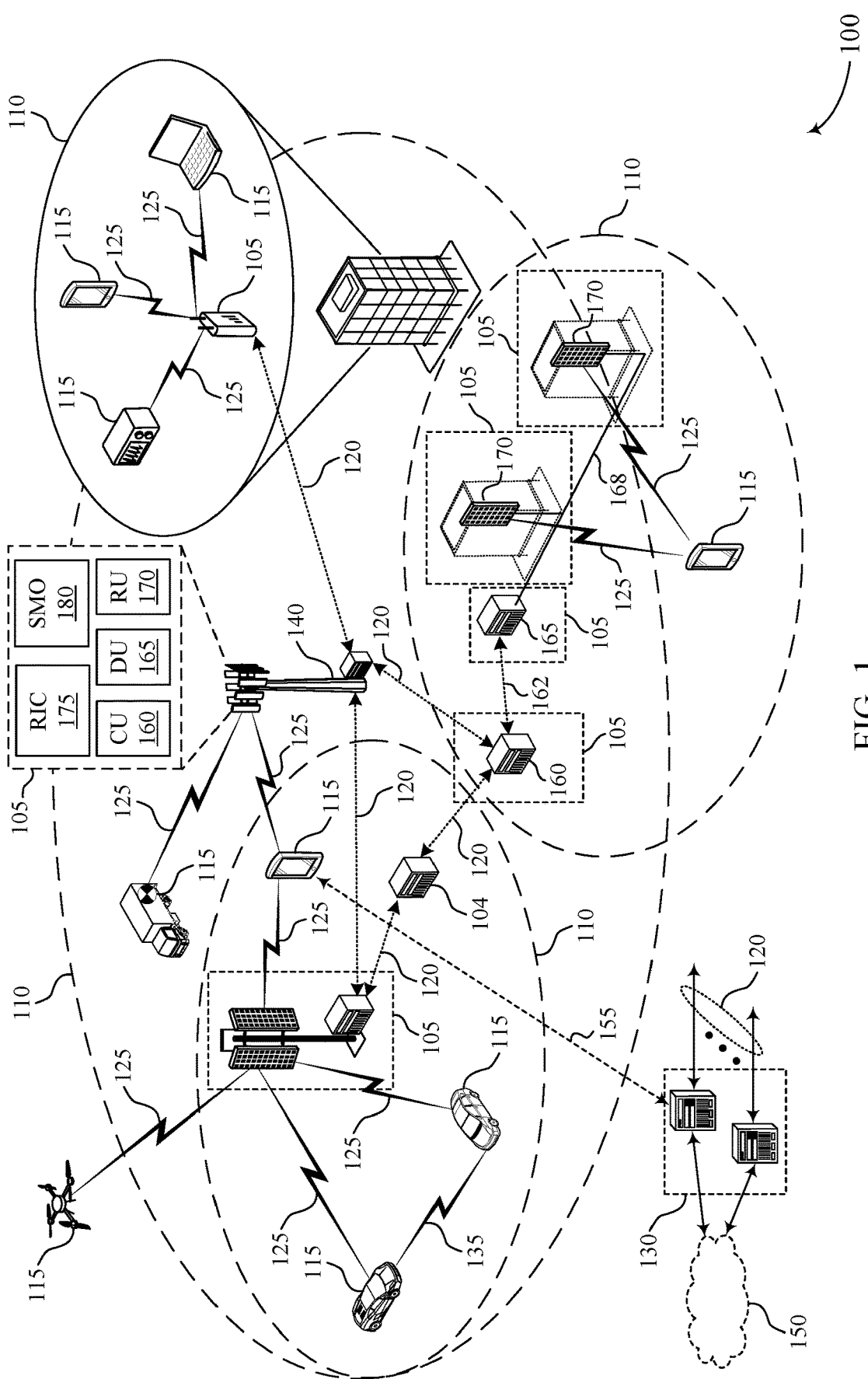
FIG. 1 illustrates an example of a wireless communications system that supports mobile integrated access and backhaul (IAB) connectivity in accordance with one or more aspects of the present disclosure.

Some wireless communications systems support integrated access and backhaul (IAB) nodes that may require a backhaul connectivity to a parent IAB node or an IAB donor node that supports functionalities of the IAB node. For stationary IAB nodes, proper network deployment and planning may create a nearly static, stable IAB network. However, for a mobile IAB node that moves freely throughout a network (e.g., an IAB node mounted on top of a car or other moving vehicle), the wireless backhaul connectivity that supports the operations of the mobile IAB node may be unavailable in some locations. As such, there may be times or locations where the mobile IAB node may not continue its normal operation as an IAB node to serve one or more user equipments (UEs), for example, if the mobile IAB node loses wireless backhaul connectivity while moving. Without the wireless backhaul connectivity, the mobile wireless node may stop serving (e.g., communicating with) UEs it is connected to. As such, the UEs may experience radio link failure and attempt to find and connect to other cells, which may be a time and power intensive process and limit UE communications.

The techniques described herein support extended backhaul connectivity for mobile IAB nodes. A mobile IAB node, such as a vehicle-mounted IAB node, may support multiple network connectivity modes. For example, the mobile IAB node may support IAB operations, non-IAB relay operations, repeater operations, UE relaying, or the like. The mobile IAB node may transmit a control message to a parent IAB node indicating the multiple supported network connectivity modes. Each network connectivity mode may provide network connectivity to one or more UEs via the mobile IAB node when a wireless backhaul connection (e.g., between the mobile IAB node and the parent IAB node) is lost. The parent IAB node may transmit a reply message authorizing the mobile IAB node to use a first network connectivity node, and the mobile IAB node may communicate with a UE in accordance with the first network connectivity mode. As such, the mobile IAB node may communicate with a UE using a particular supported network connectivity node when a wireless backhaul connection is lost, which may increase signaling throughput, decrease power consumption, and increase quality of communications for the UE and the mobile IAB node.

Implementations described in this disclosure may be implemented to realize one or more of the following potential advantages. For example, in accordance with supporting one or more network connectivity modes for establishing communications between a mobile wireless node and one or more UEs, coverage for the mobile wireless node may be extended, and communications between the mobile wireless node and various UEs may be improved. Moreover, by operating using a different network connectivity mode based what wireless devices are available for connectivity in a wireless communications system, the mobile wireless node may improve spectral efficiency and increase signaling throughout.

Aspects of the disclosure are initially described in the context of wireless communications systems. Aspects of the disclosure are then described in the context of network architectures and process flows. Aspects of the disclosure are further illustrated by and described with reference to apparatus diagrams, system diagrams, and flowcharts that relate to mobile IAB connectivity.

FIG. 1 illustrates an example of a wireless communications system 100 that supports mobile IAB connectivity in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)).

The CU 160 may be connected to one or more DUs 165 or RUs 170, and the one or more DUs 165 or RUs 170 may host lower protocol layers, such as layer 1 (L1) (e.g., physical (PHY) layer) or layer 2 (L2) (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support mobile IAB connectivity as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, an IAB node may require a wireless backhaul connectivity to a parent IAB node or an IAB donor node which may support IAB functionality. For stationary IAB nodes, using correct network deployment and planning may create an almost static and stable IAB network. Alternatively, some IAB nodes may be mobile. For example, a mobile IAB node may be mounted to a top of a bus or other moving vehicle, and may move freely throughout a network. However, the wireless backhaul connectivity that supports mobile IAB operations may be unavailable in some scenarios. For example, because of the mobile IAB node's movements, there may be particular times or places where the mobile IAB node may fail to continue its normal operations as an IAB node to serve one or more UEs (e.g., if the wireless backhaul connectivity is lost). Without the wireless backhaul connectivity, the mobile wireless node may stop serving (e.g., communicating with) UEs 115 it is connected to. As such, the UEs 115 may experience radio link failure and attempt to find and connect to other cells, which may be a time and power intensive process and limit UE 115 communications.

The wireless communications system 100 may support mobile IAB operations when a wireless backhaul connection with a parent IAB node is lost. A mobile IAB node, such as a vehicle-mounted IAB node, may support multiple network connectivity modes. For example, the mobile IAB node may support IAB operations, non-IAB relay operations, repeater operations, UE relaying, or the like. The mobile IAB node may transmit a control message to a parent IAB node indicating the multiple supported network connectivity modes. Each network connectivity mode may provide network connectivity to one or more UEs 115 via the mobile IAB node when a wireless backhaul connection (e.g., between the mobile IAB node and the parent IAB node) is lost. The parent IAB node may transmit a reply message authorizing the mobile IAB node to use a first network connectivity node, and the mobile IAB node may communicate with a UE 115 in accordance with the first network connectivity mode.

Figure 2:
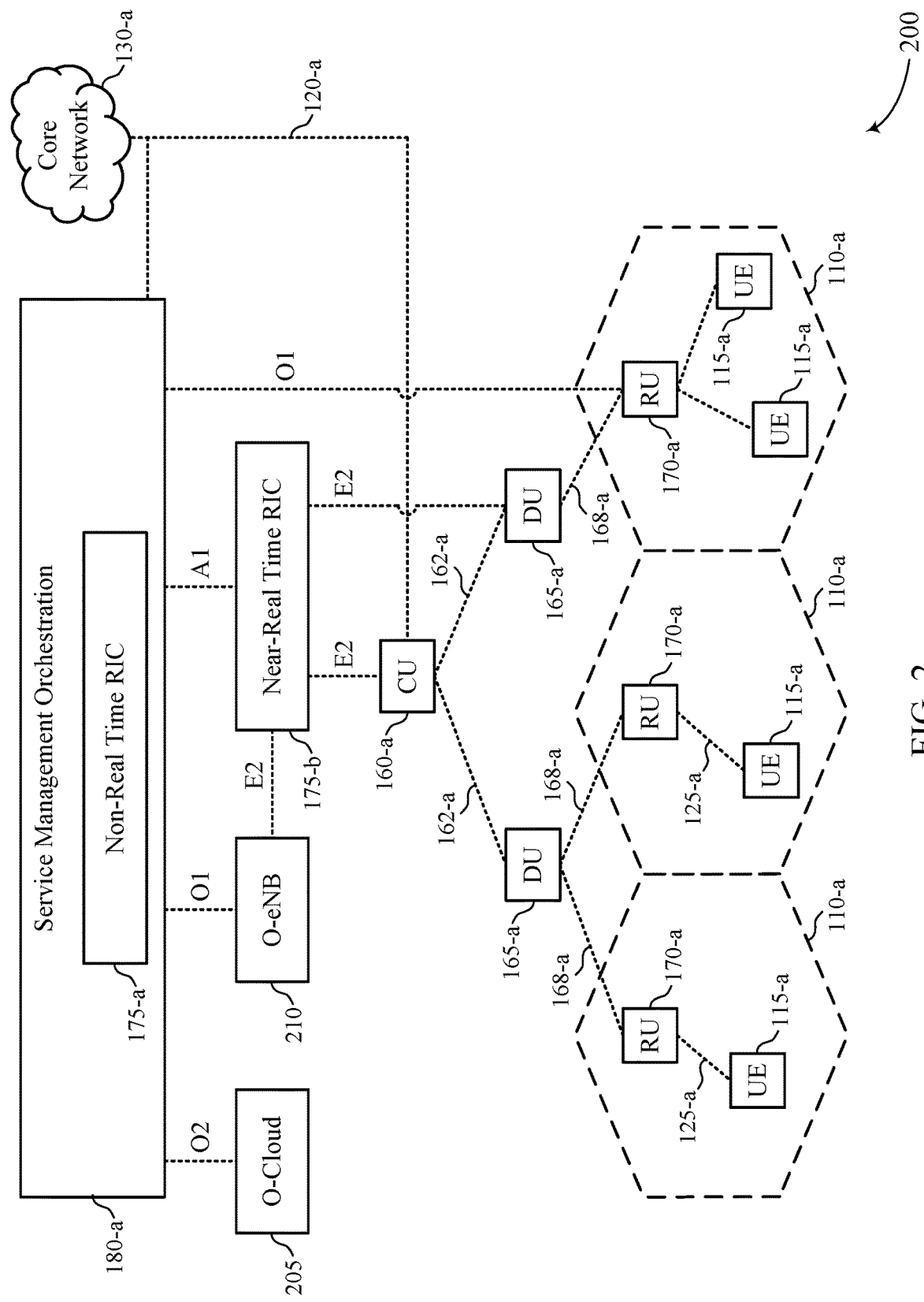
FIG. 2 illustrates an example of a network architecture that supports mobile IAB connectivity in accordance with one or more aspects of the present disclosure.

FIG. 2 illustrates an example of a network architecture 200 (e.g., a disaggregated base station architecture, a disaggregated RAN architecture) that supports mobile IAB connectivity in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., A1 policies).

The network architecture 200 may support mobile IAB operations when a wireless backhaul connection with a parent IAB node is lost. A mobile IAB node, such as a vehicle-mounted IAB node, may support multiple network connectivity modes. For example, the mobile IAB node may support IAB operations, non-IAB relay operations, repeater operations, UE relaying, or the like. The mobile IAB node may transmit a control message to a parent IAB node indicating the multiple supported network connectivity modes. Each network connectivity mode may provide network connectivity to one or more UEs 115 via the mobile IAB node when a wireless backhaul connection (e.g., between the mobile IAB node and the parent IAB node) is lost. The parent IAB node may transmit a reply message authorizing the mobile IAB node to use a first network connectivity node, and the mobile IAB node may communicate with a UE 115-*a* in accordance with the first network connectivity mode.

Figure 3:
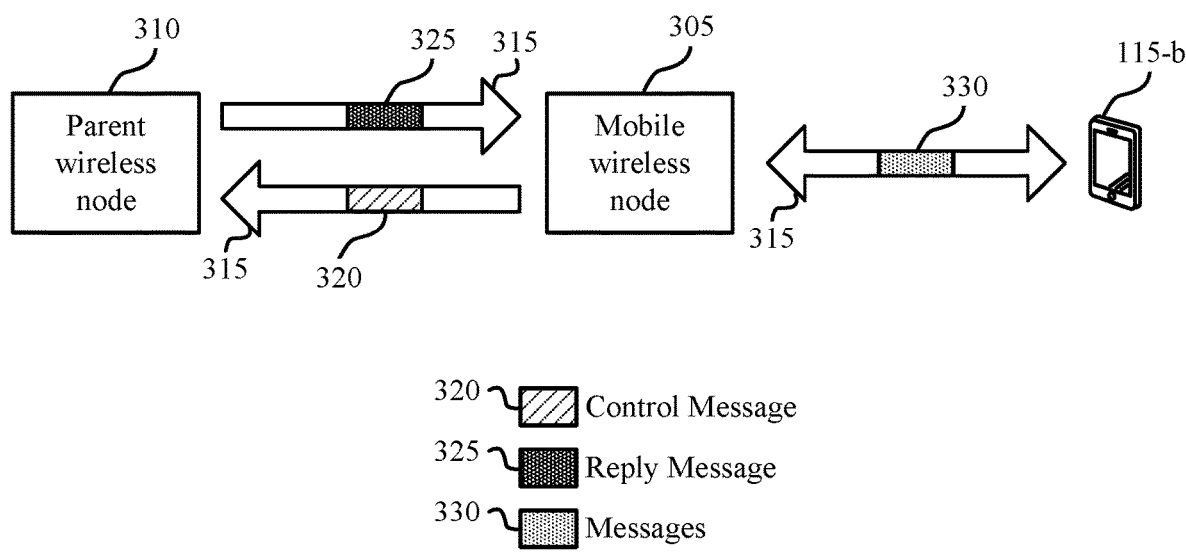
FIG. 3 illustrates an example of a wireless communications system that supports mobile IAB connectivity in accordance with one or more aspects of the present disclosure.

FIG. 3 illustrates an example of a wireless communications system 300 that supports mobile IAB connectivity in accordance with one or more aspects of the present disclosure. In some examples, the wireless communications system 300 may implement aspects of the wireless communications system 100 and the network architecture 200 or may be implemented by aspects of the wireless communications system 100 and the network architecture 200. For example, the wireless communications system 300 may include a UE 115-*b*, a mobile wireless node 305 (e.g., a mobile IAB node), and a parent wireless node 310 (e.g., a parent IAB node), which may be examples of corresponding devices as described herein. In some examples, the mobile wireless node 305 may use a network connectivity mode to communicate with the UE 115-*b* when a wireless backhaul connection with the parent wireless node 310 is lost, which may increase signaling throughput and increase the reliability of communications.

The wireless communications system 300 may support communications between the UE 115-*b*, the mobile wireless node 305, and the parent wireless node 310. For example, the mobile wireless node 305 and the parent wireless node 310 may communicate uplink and downlink transmissions via respective communication links 315, which may be examples of communication links 135 described with reference to FIG. 1. In addition, the mobile wireless node 305 may communicate signaling with one or more UEs 115, including the UE 115-*b*, via a communication link 315.

In some cases, the mobile wireless node 305 may be mounted on top of a bus, car, train, or other moving vehicle such that the mobile wireless node 305 may move throughout the wireless communications system 300. In some examples, because of such movement, the mobile wireless node 305 may lose wireless backhaul connectivity with the parent wireless node 310, where the wireless backhaul connectivity may provide support for operations of the mobile wireless node 305. For example, the mobile wireless node 305 may move at a particular time or two a particular location that is outside of a coverage area of the parent wireless node 310.

The mobile wireless node 305 may have a default mode of operation (e.g., an IAB network connectivity mode). However, while using the default mode of operation, the functionality of the mobile wireless node 305 may be unsupported (e.g., the wireless backhaul connectivity with the parent wireless node 310 may be lost). To maintain communications with the UE 115-b while the wireless backhaul connectivity is lost, the mobile wireless node 305 may still be connected to another wireless device (e.g., a network entity, a gNB) that is within a coverage area of the parent wireless node 310, where the wireless device may support the operations of the mobile wireless node 305. In addition, the mobile wireless node 305 may support multiple other network connectivity modes (e.g., modes of operation). In this way, if the wireless device supports a same network connectivity modes as the mobile wireless node 305, the mobile wireless node 305 may provide service to the UE 115-b using one of the network connectivity modes despite the wireless backhaul connectivity with the parent wireless node 310 being lost.

In some cases, the mobile wireless node 305 may transmit, to the parent wireless node, a control message 320 indicating one or more network connectivity modes supported by the mobile wireless node 305. The one or more network connectivity modes may provide network connectivity to one or more UEs 115 (such as the UE 115-b) via the mobile wireless node 305 when the wireless backhaul connectivity is lost between the mobile wireless node 305 and the parent wireless node 310. In some examples, the network connectivity modes may include an IAB network connectivity mode (including an IAB-MT and an IAB-DU), a non-IAB relay network connectivity mode (including a UE and a network entity), a repeater network connectivity mode (including a network-controlled repeater (NCR), an autonomous repeater (AR), or a conventional or basic repeater (BR)), a UE relaying network connectivity mode, or any combination thereof. Additionally, the wireless communications system 300 may support alternative network connectivity modes, and the mobile wireless node 305 may change its mode of operation accordingly.

The mobile wireless node 305 may change its network connectivity mode of operation. For example, the mobile wireless node 305 may receive a reply message 325 from the parent wireless node 310 indicating authorization to use at least a first network connectivity mode. Thus, the mobile wireless node 305 may communicate one or more messages 330 with the UE 115-b (e.g., a first UE of one or more UEs 115) in accordance with the first network connectivity mode. Examples of communications in accordance with other network connectivity modes are described herein with reference to FIGS. 4 and 5.

In some cases, the mobile wireless node 305 may select a network connectivity mode (e.g., mode of service or operation) for a particular UE 115 based on one or more factors. The parent wireless node 310 may authorize the mobile wireless node 305 to operate under all or a subset of the supported network connectivity modes. For example, the mobile wireless node 305 may select a network connectivity mode based on a capability of the UE 115-b (e.g., to support sidelink communications), a quality of service (QoS) metric (e.g., a QoS requirement), a radio resource management (RRM) measurement (e.g., of an outside cell), an interference measurement (e.g., self-interference (SI) or cross-link interference (CLI) measurement), or any combination thereof. For example, the mobile wireless node 305 may use a UE relaying network connectivity mode if the UE 115-b is capable of supporting sidelink communications. Alternatively, if other network connectivity modes are associated with other levels of performance and if the UE 115-b is a low-latency device, the mobile wireless node 305 may select a repeater-based network connectivity mode as it may be a simplest and fastest (e.g., lowest latency) mode of operation. Using RRM measurements, the mobile wireless node 305 may determine that the UE 115-b lacks a strong or viable connection with an outside cell, and thus may select a relay or repeater-based mode of operation that is best suited for the UE 115-b. Alternatively, some UEs 115 may be indicated to directly connect to an outside cell. For some network connectivity modes, some backhaul and access connections may interference with each other, and how efficiently the mobile wireless node 305 may operate in a full-duplex mode may depend on a level of SI or CLI.

The mobile wireless node 305 may indicate the one or more network connectivity modes it supports, one or more activated network connectivity modes, and one or more future network connectivity modes to the UE 115-b and any other UEs 115 in wireless communications with the mobile wireless node 305. That is, the mobile wireless node 305 may transmit, to one or more UEs 115, an indication of the first network connectivity mode (e.g., via broadcast or dedicated RRC signaling). Additionally, or alternatively, the mobile wireless node 305 may indicate its supported network connectivity modes to a network node, which may include the parent wireless node 310, a donor IAB node, a CU, a core network, a gNB, and the like. For example, the mobile wireless node 305 may transmit a message to the parent wireless node 310 indicating that the mobile wireless node 305 is operating using the first network connectivity mode for communication with the UE 115-b.

In some examples, the mobile wireless node 305 may change its supported or active network connectivity modes. The mobile wireless node 305 may receive an indication to change a network connectivity mode from the parent wireless node 310, transmit an indication of the change to the UE 115-b, or both. Additionally, the mobile wireless node 305 may request a change of network connectivity modes (e.g., across numerous network connectivity modes). For example, the mobile wireless node 305 may transmit, to the parent wireless node 310, a request to change between operating using the first network connectivity mode to a second network connectivity mode, and the mobile wireless node 305 may receive an indication from the parent wireless node 310 to make the change from operating using the first network connectivity mode to the second network connectivity mode.

In some cases, the parent wireless node 310 may authorize the change between network connectivity modes and in some cases, may indicate rules or criteria associated with the change. For example, the reply message 325 may indicate authorization to use the second network connectivity mode and indicating at least one criterion for changing between operating using the first network connectivity mode and the second network connectivity mode. In some examples, based on the trajectory (e.g., mobile path) of the mobile wireless node 305, the mobile wireless node 305 may request to change network connectivity modes based on a particular time or location, information which the mobile wireless node 305 may share a priori across various entities or interfaces. Some rules or criteria may be based on a power of a signal satisfying a configured threshold, cell identifiers associated with the parent wireless node 310, or some other criteria. As used herein, "satisfying a configured threshold" may, depending on the context, refer to a value being greater than the threshold, greater than or equal to the threshold, less than the threshold, less than or equal to the threshold, equal to the threshold, not equal to the threshold, or the like. In addition, the mobile wireless node 305 may transmit an indication of the change to one or more UEs 115 in wireless communication with the mobile wireless node 305.

Figure 4:
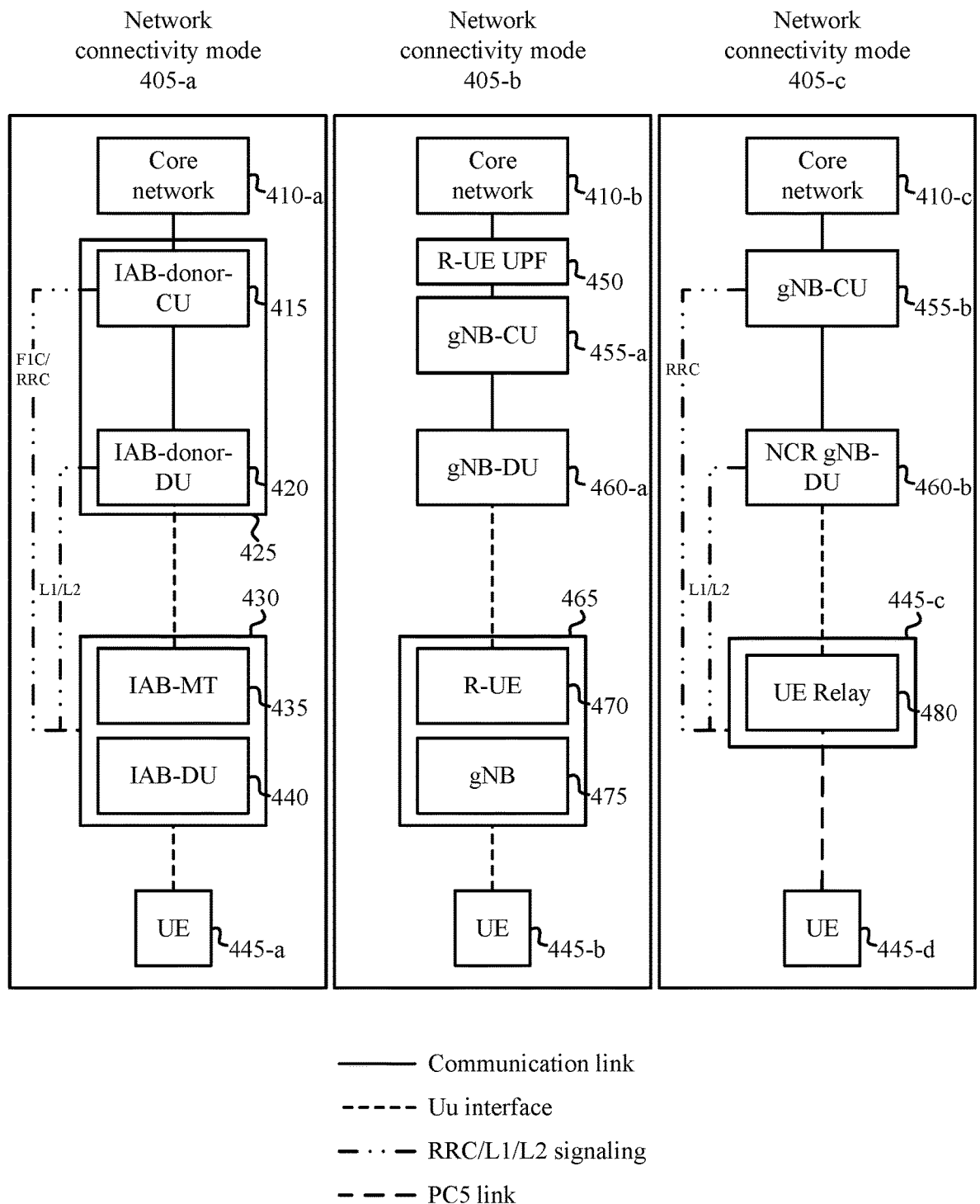
FIGS. 4 and 5 illustrate examples of network architectures that support mobile IAB connectivity in accordance with one or more aspects of the present disclosure.

FIG. 4 illustrates an example of network architectures 400 that supports mobile IAB connectivity in accordance with one or more aspects of the present disclosure. In some examples, the network architectures 400 may implement aspects of the wireless communications systems 100 and 300 or may be implemented by aspects of the wireless communications systems 100 and 300. The network architectures 400 may support one or more network connectivity modes 405 supported by a mobile wireless node (e.g., a mobile IAB node), such as the mobile wireless node 305 described herein with reference to FIG. 3. For example, the network architectures 400 may include a network connectivity mode 405-*a*, a network connectivity mode 405-*b*, or a network connectivity mode 405-*c*.

The network connectivity mode 405-*a* may represent IAB operations, and may include an IAB node 430 (e.g., the mobile wireless node) with an IAB-MT 435 and an IAB-DU 440. A core network 410-*a* may communicate with an IAB-donor-CU 415 via a communication link, which may be an example of a communication link 125 or a communication link 315 described herein. The IAB-donor-CU 415 may communicate with an IAB-donor-DU 420 via a communication link, where the IAB-donor-CU 415 and the IAB-donor-DU 420 may be components of a parent wireless node 425 (e.g., the parent wireless node 310 described herein with reference to FIG. 3). In some examples, the IAB-donor-CU 415 and IAB-donor-DU 420 may be examples of a CU 160 and a DU 165, respectively, as described herein with reference to FIGS. 1 and 2. The IAB-DU 440 may provide connectivity to the UE 445-*a* via a Uu interface (e.g., link), such that the IAB node 430 may communicate with the UE 445-*a*. In addition, the IAB-MT 435 may be connected to the IAB-donor-DU 420 of the parent wireless node 425 via a Uu interface. If traffic is to be forwarded to the UE 445-*a*, the IAB node 430 may receive and decode the traffic from the parent wireless node 425, and the IAB-DU 440 may schedule transmission of the traffic to the UE 445-*a*.

In some cases, the parent wireless node 425 may provide control signaling to the IAB node 430. For example, the IAB-donor-CU 415 may transmit control signaling to the IAB node 430 via an F1 control (F1C) interface or RRC signaling, and the IAB-donor-DU 420 may transmit control signaling to the IAB node 430 via L1 or L2 signaling. In some examples, the IAB-MT 435 may forward signaling to the IAB-DU 440. In this way, the parent wireless node 425 may provide control signaling and a wireless backhaul connectivity to the IAB node 430 such that the IAB node 430 may communicate with the UE 445-*a*.

In some examples, wireless backhaul connectivity may be lost between a mobile wireless node (e.g., a mobile IAB node) and a parent wireless node (e.g., a parent IAB node, a network entity), for example, when the mobile wireless node moves to a location where connectivity with the parent wireless node is lost and thus, some features of the mobile wireless node are unsupported. In such cases, the mobile wireless node may use the network connectivity mode 405-*b* or the network connectivity mode 405-*c* to mimic IAB operations based on its connectivity to another wireless device such that the mobile wireless node may maintain communications with a UE 445.

The network connectivity mode 405-*b* may represent non-IAB relay operations, and may include a relay-UE (R-UE) and a gNB (e.g., a network entity, a base station). The network connectivity mode 405-*b* may support full-functionality of the gNB, whose connection to a core network 410-*b* is supported over an IP connection and via the R-UE. The core network 410-*b* may communicate with an R-UE user plane function (UPF) 450 via a communication link. The R-UE UPF 450 may communicate with the gNB-CU 455-*a* via a communication link. In addition, the gNB-CU 455-*a* may communicate with the gNB-DU 460-*a* via a communication link, where the gNB-CU 455-*a* and a gNB-DU 460-*a* may be components of the gNB. In some examples, the gNB-CU 455-*a* and the gNB-DU 460-*a* may be examples of a CU 160 and a DU 165, respectively, as described herein with reference to FIGS. 1 and 2.

The gNB-DU 460-*a* may provide connectivity to the UE 445-*b* via a Uu interface, such that the gNB may communicate with the UE 445-*b*. In addition, the gNB-DU 460-*a* of the gNB may be connected to the R-UE 470 of a wireless node 465. If traffic is to be forwarded to the UE 445-*b*, the R-UE 470 and a gNB 475 of the wireless node 465 may receive and decode the traffic from the gNB-DU 460-*a* and schedule a transmission of the traffic to the UE 445-*b*. For example, the R-UE 470 may receive, from the gNB-DU 460-*a*, a first grant scheduling transmission of a message associated with the UE 445-*b* to the R-UE 470. The R-UE 470 may receive the message based on the first grant and transmit a second grant to the gNB 475 scheduling transmission of the message to the UE 445-*b*. The gNB 475 may transmit the message to the UE 445-*b* based on the second grant. As such, the connection from the UE 445-*b* is terminated at the gNB 475, and the gNB 475 may process signals for the UE 445-*b*. In this way, the gNB-CU 455-*a* and the gNB-DU 460-*a* may provide connectivity to the wireless node 465 such that the wireless node 465 may communicate with the UE 445-*b* when wireless backhaul connectivity with a parent wireless node is lost.

The network connectivity mode 405-*c* may represent UE relay operations. When the wireless backhaul connectivity is lost between a mobile wireless node and a parent wireless node, the network connectivity mode 405-*c* may mimic IAB operations based on the connectivity between a gNB and a UE 445-*c*. That is, if a UE 445-*c* is within a coverage area of the gNB, the UEs 445-*c* may effectively extend coverage of the gNB to a UE 445-*d* that is outside of the coverage area of the gNB via sidelink communications.

In some examples, a core network 410-*c* may communicate with a gNB-CU 455-*b* via a communication link. The gNB-CU 455-*b* may communicate with a gNB-DU 460-*b* (e.g., an NCR gNB-DU) via a communication link, where the gNB-CU 455-*b* and the gNB-DU 460-*b* may be components of a gNB. The gNB-CU 455-*b* and the gNB-DU 460-*b* may be examples of a CU 160 and a DU 165, respectively, as described herein with reference to FIGS. 1 and 2. In some examples, the gNB-DU 460-*b* may provide connectivity to a UE relay 480 via a Uu interface, where the UE relay 480 may be a component of a UE 445-*c*. In addition, the UE relay 480 may be connected to the UE 445-*d* via a PC5 interface such that the UE relay 480 may forward signaling from the gNB to the UE 445-*d*. In this way, connectivity from the gNB may be extended to the UE 445-*d* via the UE 445-*c*, where the UE 445-*c* and the UE 445-*d* may both support and communicate via sidelink communications.

In some cases, the gNB may provide control signaling to the UE 445-*c*. For example, the gNB-CU 455-*b* may transmit control signaling to the UE 445-*c* via RRC signaling, and the gNB-DU 460-*b* may transmit control signaling to the UE 445-*c* via RRC signaling. In some examples, the UE relay 480 may forward signaling from the gNB to the UE 445-*d*. In some cases, the UE 445-*d* may transmit a capability message indicating that it supports sidelink communications. Accordingly, the gNB, via the UE 445-*c*, may transmit an indication of a sidelink configuration for the network connectivity mode 405-*c* to the UE 445-*c* to enable sidelink communications between the UE 445-*c* and the UE 445-*d*. In this way, the gNB may provide control signaling and a wireless backhaul connectivity to the UE 445-*c* such that the UE 445-*d* may communicate with the UE 445-*d* via a sidelink connection.

Figure 5:
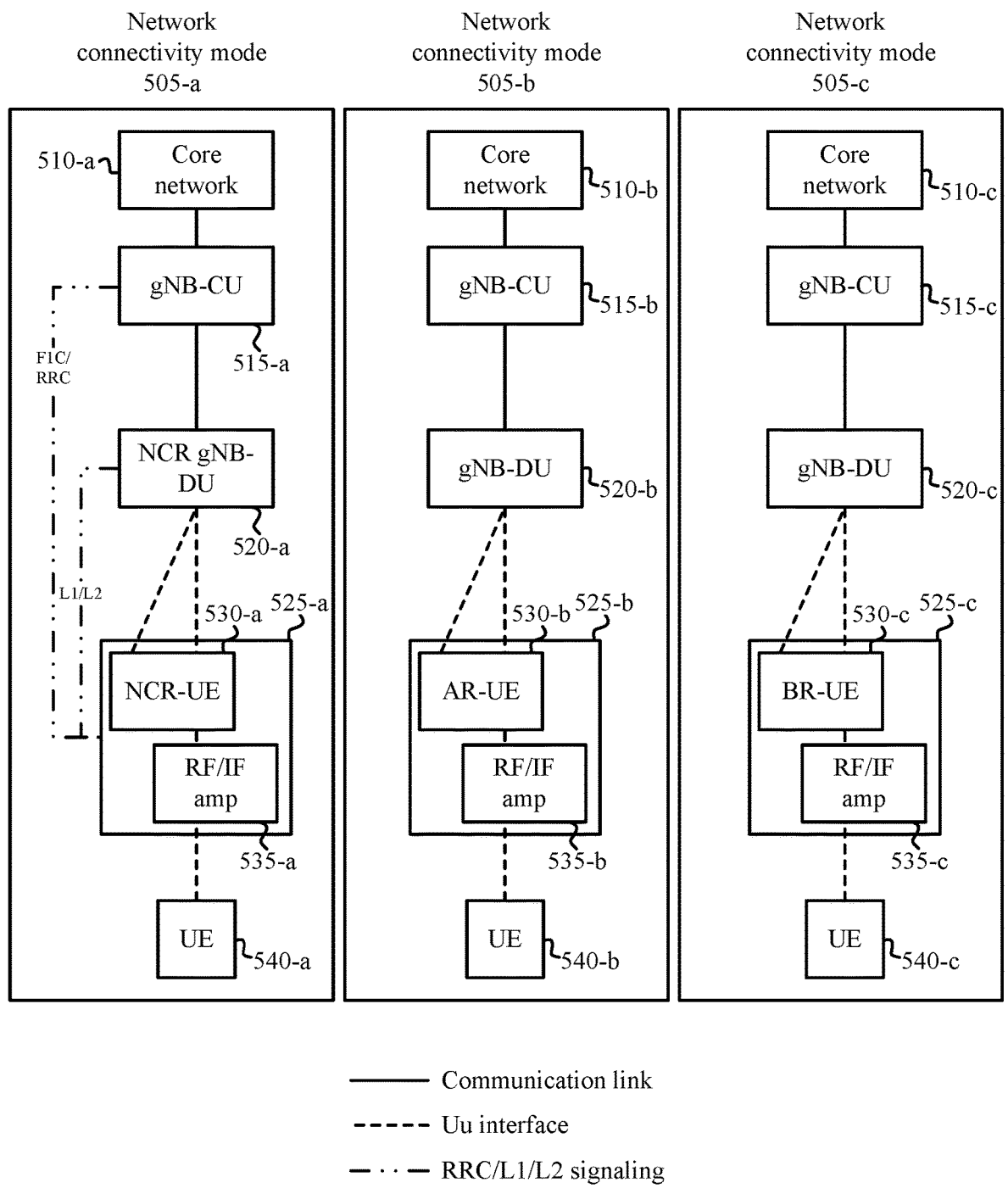

FIG. 5 illustrates an example of network architectures 500 that supports mobile IAB connectivity in accordance with one or more aspects of the present disclosure. In some examples, the network architectures 500 may implement aspects of the wireless communications systems 100 and 300 or may be implemented by aspects of the wireless communications systems 100 and 300. The network architectures 500 may support one or more network connectivity modes 505 supported by a mobile wireless node (e.g., a mobile IAB node), such as the mobile wireless node 305 described herein with reference to FIG. 3. For example, the network architectures 500 may include a network connectivity mode 505-*a*, a network connectivity mode 505-*b*, or a network connectivity mode 505-*c*. The network connectivity modes 505 may represent various repeater-based modes of operation, where a repeater 525 may receive, amplify, and a signal from a gNB or another parent wireless node to a UE 540 (e.g., extend coverage from the gNB to the UE 540). In some examples, a UE 540 may include a subset of functions of an eMBB UE, but may also include additional features and functionalities.

In some examples, wireless backhaul connectivity may be lost between a mobile wireless node (e.g., a mobile IAB node) and a parent wireless node (e.g., a parent IAB node, a network entity), for example, when the mobile wireless node moves to a location where connectivity with the parent wireless node is lost and thus, some features of the mobile wireless node are unsupported. In such cases, the mobile wireless node may use a network connectivity mode 505 to mimic IAB operations based on its connectivity to another wireless device such that the mobile wireless node may maintain communications with a UE 540. In some cases, to facilitate such connectivity, a repeater 525 may receive, from a gNB or other parent wireless node, a grant scheduling transmission of a message associated with the UE 540 to the repeater 525. The repeater 525 may then relay the message to the UE 540 based on the grant.

The network connectivity mode 505-*a* may represent NCR operations. An NCR, such as a repeater 525-*a*, may be an analog repeater that may be controlled by a network. For example, the network may configure the repeater to turn on and off, receive and forward signals in particular directions, and the like. In some examples, a core network 510-*a* may communicate with a gNB-CU 515-*a* via a communication link, which may be an example of a communication link 125 or a communication link 315 described herein. The gNB-CU 515-*a* may be connected to a gNB-DU 520-*a* (e.g., an NCR gNB-DU) via a communication link, where the gNB-CU 515-*a* and the gNB-DU 520-*a* may be components of a gNB or another parent wireless node. In some examples, the gNB-CU 515-*a* and the gNB-DU 520-*a* may be examples of a CU 160 and a DU 165, respectively, as described herein with reference to FIGS. 1 and 2.

In some examples, the repeater 525-*a* may include an RF/IF amplifier 535-*a* that forwards signaling to a UE 540-*a* via a Uu interface (e.g., link). In addition, the repeater 525-*a* may include a UE 530-*a* (e.g., an NCR-UE) that is connected to the gNB (e.g., a network) via a Uu interface. In this way, the gNB-DU 520-*a* may be connected to the UE 530-*a* and the RF/IF amplifier 535-*a* of the repeater 525-*a* via respective Uu interfaces. For example, the repeater 525-*a* may receive signals from the gNB and the RF/IF amplifier 535-*a* may amplify and forward the signals to the UE 540-*a* such that the repeater 525-*a* may provide connectivity between the UE 445-*a* and the gNB.

In some cases, the gNB may provide control signaling to the repeater 525-*a*. For example, the gNB-CU 515-*a* may transmit control signaling to the repeater 525-*a* via RRC signaling, and the gNB-DU 520-*a* may transit control signaling to the repeater 525-*a* via L1 or L2 signaling. In this way, the gNB may provide control signaling and a wireless backhaul connectivity to the repeater 525-*a* such that the gNB may communicate with the UE 540-*a*.

The network connectivity mode 505-*b* may represent AR (e.g., autonomously-smart repeater) operations. An AR, such as a repeater 525-*b*, may autonomously receive, amplify, and forward signals in particular directions to UEs such as a UE 540-*b*. That is, the repeater 525-*b* may determine power, direction, and other factors associated with receiving, amplifying, and forwarding signals without an indication from a gNB (e.g., a network). In some examples, a core network 510-*b* may communicate with a gNB-CU 515-*b* via a communication link, which may be an example of a communication link 125 or a communication link 315 described herein. The gNB-CU 515-*b* may be connected to a gNB-DU 520-*b* (e.g., an NCR gNB-DU) via a communication link, where the gNB-CU 515-*b* and the gNB-DU 520-*b* may be components of a gNB or another parent wireless node. In some examples, the gNB-CU 515-*b* and the gNB-DU 520-*b* may be examples of a CU 160 and a DU 165, respectively, as described herein with reference to FIGS. 1 and 2.

In some examples, the repeater 525-*b* may include an RF/IF amplifier 535-*b* that forwards signaling to a UE 540-*b* via a Uu interface (e.g., link). In addition, the repeater 525-*b* may include a UE 530-*b* (e.g., an AR-UE) that is connected to the gNB (e.g., a network) via a Uu interface. In this way, the gNB-DU 520-*b* may be connected to the UE 530-*b* and the RF/IF amplifier 535-*b* of the repeater 525-*b* via respective Uu interfaces. For example, the repeater 525-*b* may receive signals from the gNB and the RF/IF amplifier 535-*b* may amplify and forward the signals to the UE 540-*b* such that the repeater 525-*b* may provide connectivity between the UE 445-*b* and the gNB.

The network connectivity mode 505-*c* may represent BR operations. A BR, such as a repeater 525-*c*, may perform basic receive, amplify, and forward operations for a UE 540-*c*. In some examples, a core network 510-*c* may communicate with a gNB-CU 515-*c* via a communication link, which may be an example of a communication link 125 or a communication link 315 described herein. The gNB-CU 515-*c* may be connected to a gNB-DU 520-*c* (e.g., an SR gNB-DU) via a communication link, where the gNB-CU 515-*c* and the gNB-DU 520-*c* may be components of a gNB or another parent wireless node. In some examples, the gNB-CU 515-*c* and the gNB-DU 520-*c* may be examples of a CU 160 and a DU 165, respectively, as described herein with reference to FIGS. 1 and 2.

In some examples, the repeater 525-*c* may include an RF/IF amplifier 535-*c* that forwards signaling to a UE 540-*c* via a Uu interface (e.g., link). In addition, the repeater 525-*c* may include a UE 530-*c* (e.g., an AR-UE) that is connected to the gNB (e.g., a network) via a Uu interface. In this way, the gNB-DU 520-*c* may be connected to the UE 530-*c* and the RF/IF amplifier 535-*c* of the repeater 525-*c* via respective Uu interfaces. For example, the repeater 525-*c* may receive signals from the gNB and the RF/IF amplifier 535-*c* may amplify and forward the signals to the UE 540-*c* such that the repeater 525-*c* may provide connectivity between the UE 445-*c* and the gNB.

Figure 6:
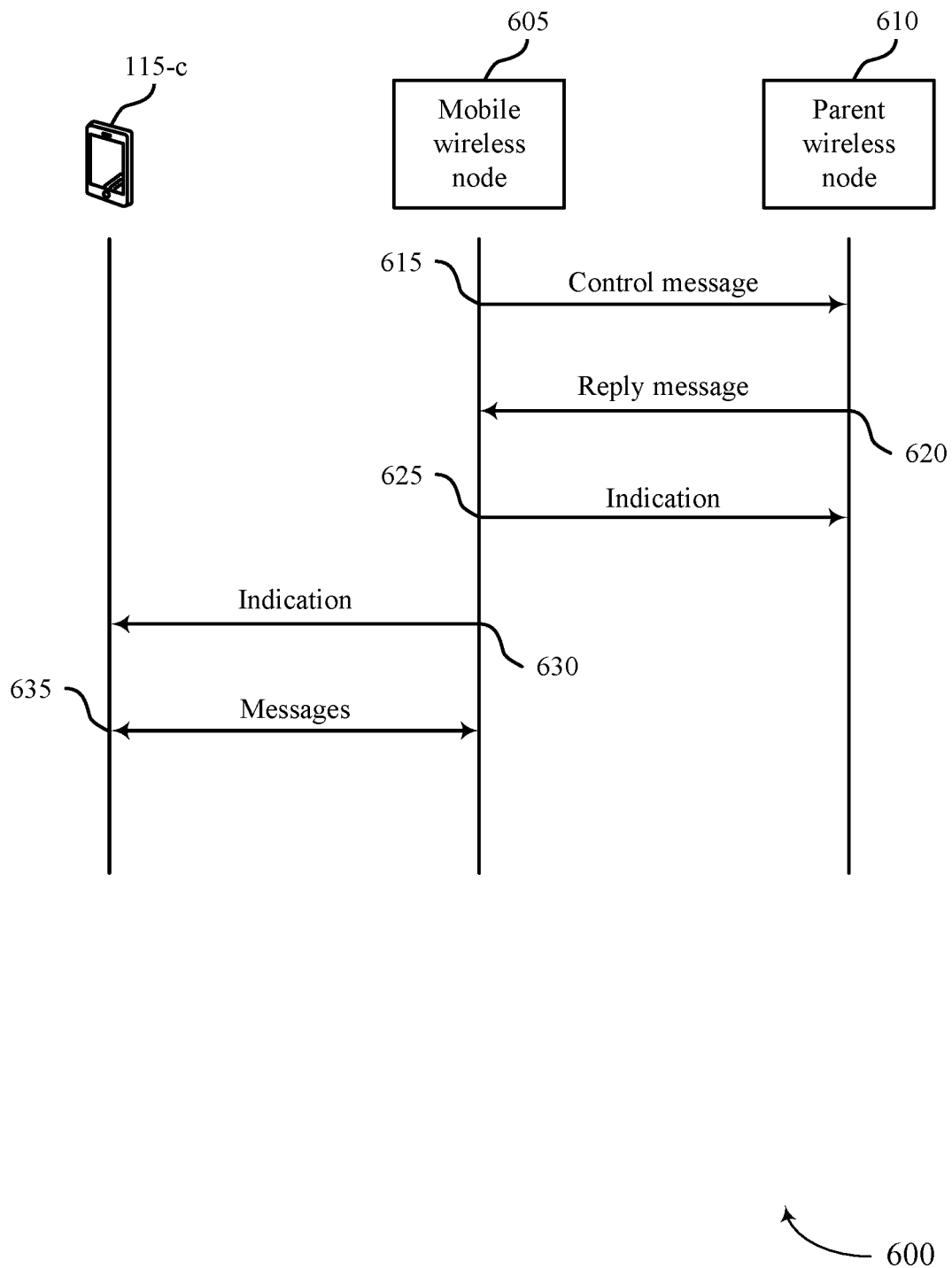
FIG. 6 illustrates an example of a process flow that supports mobile IAB connectivity in accordance with one or more aspects of the present disclosure.

FIG. 6 illustrates an example of a process flow 600 that supports mobile IAB connectivity in accordance with one or more aspects of the present disclosure. The process flow 600 may implement aspects of wireless communications systems 100 and 300 or may be implemented by aspects of the wireless communications system 100 and 300. For example, the process flow 600 may illustrate operations between a UE 115-*c*, a mobile wireless node 605 (e.g., a mobile IAB node), and a parent wireless node 610 (e.g., a parent IAB node), which may be examples of corresponding devices described herein. In the following description of the process flow 600, the operations between the UE 115-*c*, the mobile wireless node 605, and the parent wireless node 610 may be transmitted in a different order than the example order shown, or the operations performed by the UE 115-*c*, the mobile wireless node 605, and the parent wireless node 610 may be performed in different orders or at different times. Some operations may also be omitted from the process flow 600, and other operations may be added to the process flow 600.

At 615, the mobile wireless node 605 may transmit, to the parent wireless node 610, a control message indicating one or more network connectivity modes supported by the mobile wireless node 605, the one or more network connectivity modes for providing network connectivity to one or more UEs 115 (including the UE 115-*c*) via the mobile wireless node 605 when wireless backhaul connectivity is lost between the mobile wireless node 605 and the parent wireless node 610. In some cases, the one or more network connectivity modes may include an IAB mode, a non-IAB relay mode, a repeater mode, a UE relaying mode, or some other network connectivity modes.

At 620, the mobile wireless node 605 may receive, from the parent wireless node 610, a reply message indicating authorization to use at least a first network connectivity mode of the one or more network connectivity modes. For example, based on one or more criterion (e.g., power savings, UE capability), the parent wireless node 610 may authorize the mobile wireless node 605 to use all or a subset of the supported network connectivity modes for communicating with one or more UEs 115.

At 625, the mobile wireless node 605 may transmit, to the parent wireless node 610, an indication that the mobile wireless node 605 is operating using the first network connectivity mode for communication with the UE 115-*c* (e.g., a first UE). Additionally, in some cases, the mobile wireless node 605 may transmit a request to change from operating using the first network connectivity mode to a second network connectivity mode, and the parent wireless node 610 may authorize the mobile wireless node 605 to change its operations.

At 630, the mobile wireless node 605 may transmit, to the UE 115-*c*, an indication of the first network connectivity mode. That is, in some cases, the UE 115-*c* may be aware of the operations of the mobile wireless node 605 and its source of connectivity. In other cases, the UE 115-*c* may be unaware of which network connectivity mode the mobile wireless node 605 is operating in.

At 635, the mobile wireless node 605 may communicate one or more messages with the UE 115-*c* in accordance with the first network connectivity mode. That is, the mobile wireless node 605 may communicate with the UE 115-*c* using a wireless connectivity established based on the first network connectivity mode.

Figure 7:
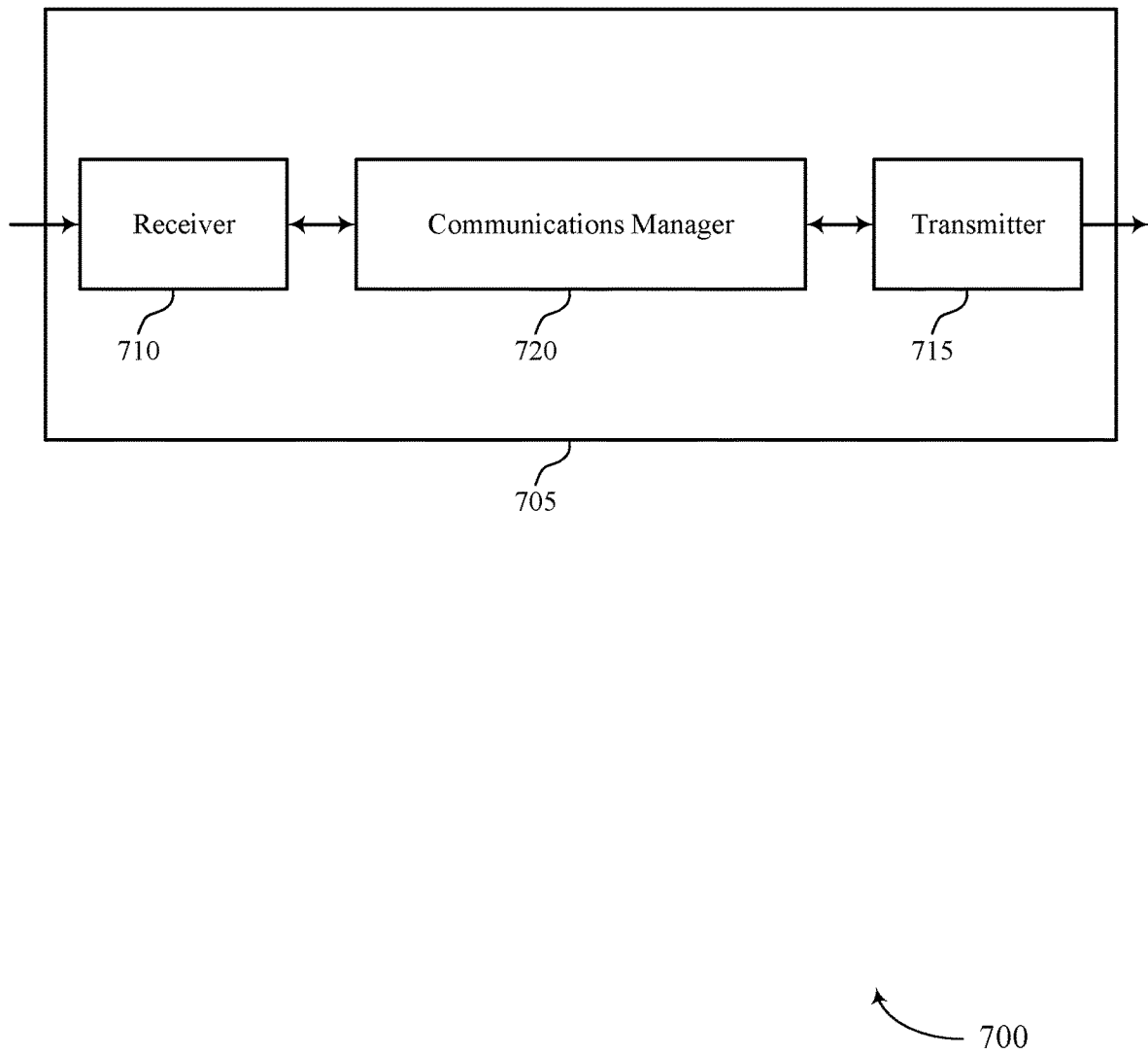
FIGS. 7 and 8 show block diagrams of devices that support mobile IAB connectivity in accordance with one or more aspects of the present disclosure.

FIG. 7 shows a block diagram 700 of a device 705 that supports mobile IAB connectivity in accordance with one or more aspects of the present disclosure. The device 705 may be an example of aspects of a mobile wireless node as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to mobile IAB connectivity). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to mobile IAB connectivity). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of mobile IAB connectivity as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication by a mobile wireless node in accordance with examples as disclosed herein. For example, the communications manager 720 may be configured as or otherwise support a means for transmitting, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The communications manager 720 may be configured as or otherwise support a means for receiving, from the parent wireless node, a reply message indicating authorization to use at least a first network connectivity mode of the one or more network connectivity modes. The communications manager 720 may be configured as or otherwise support a means for communicating one or more messages with a first UE of the one or more UEs in accordance with the first network connectivity mode.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for mobile IAB connectivity, which may increase signaling throughput, increase coverage for a mobile IAB node, and improve communications between the mobile IAB node and one or more UEs.

Figure 8:
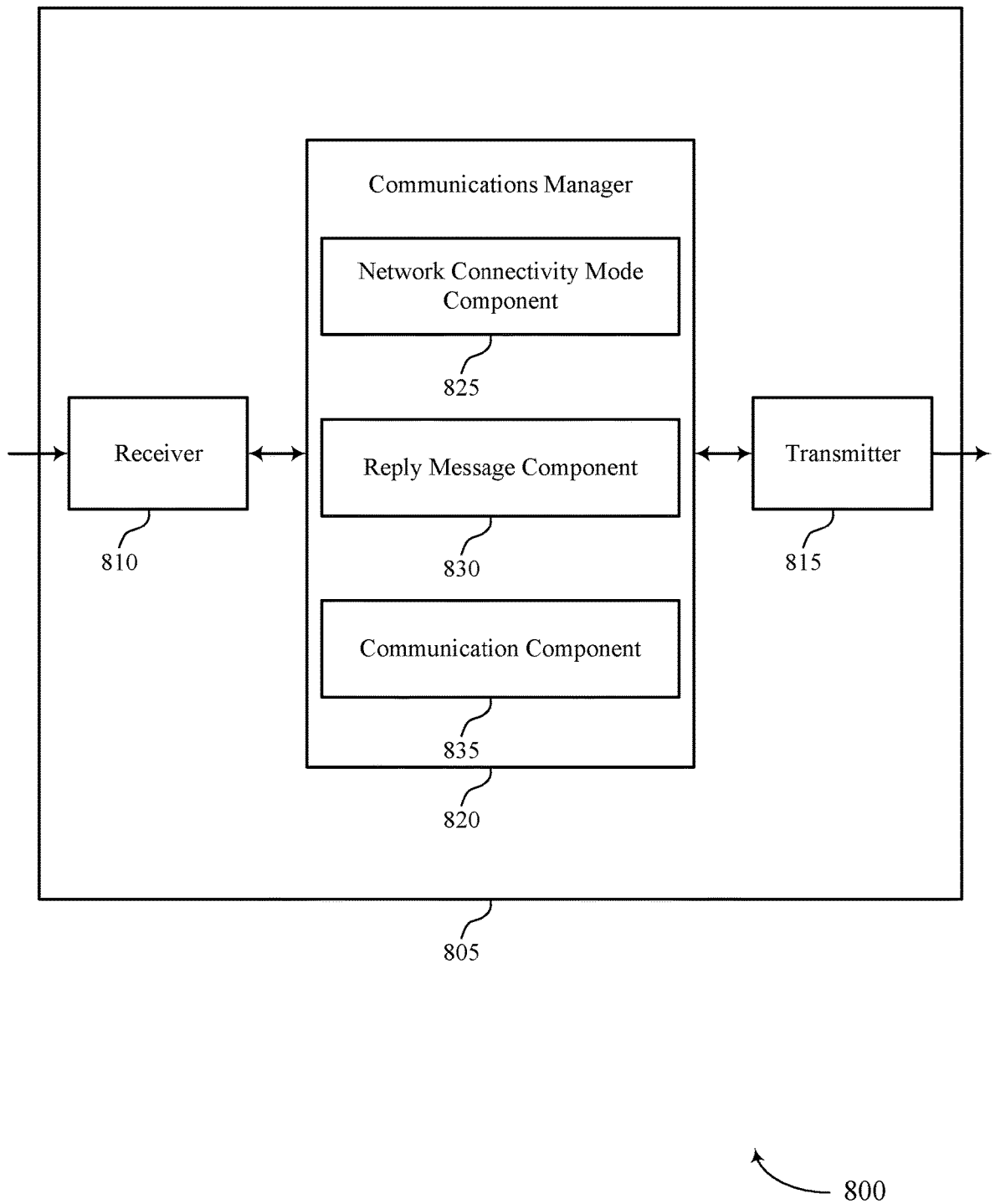

FIG. 8 shows a block diagram 800 of a device 805 that supports mobile IAB connectivity in accordance with one or more aspects of the present disclosure. The device 805 may be an example of aspects of a device 705 or a mobile wireless node 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to mobile IAB connectivity). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to mobile IAB connectivity). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of mobile IAB connectivity as described herein. For example, the communications manager 820 may include a network connectivity mode component 825, a reply message component 830, a communication component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication by a mobile wireless node in accordance with examples as disclosed herein. The network connectivity mode component 825 may be configured as or otherwise support a means for transmitting, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The reply message component 830 may be configured as or otherwise support a means for receiving, from the parent wireless node, a reply message indicating authorization to use at least a first network connectivity mode of the one or more network connectivity modes. The communication component 835 may be configured as or otherwise support a means for communicating one or more messages with a first UE of the one or more UEs in accordance with the first network connectivity mode.

Figure 9:
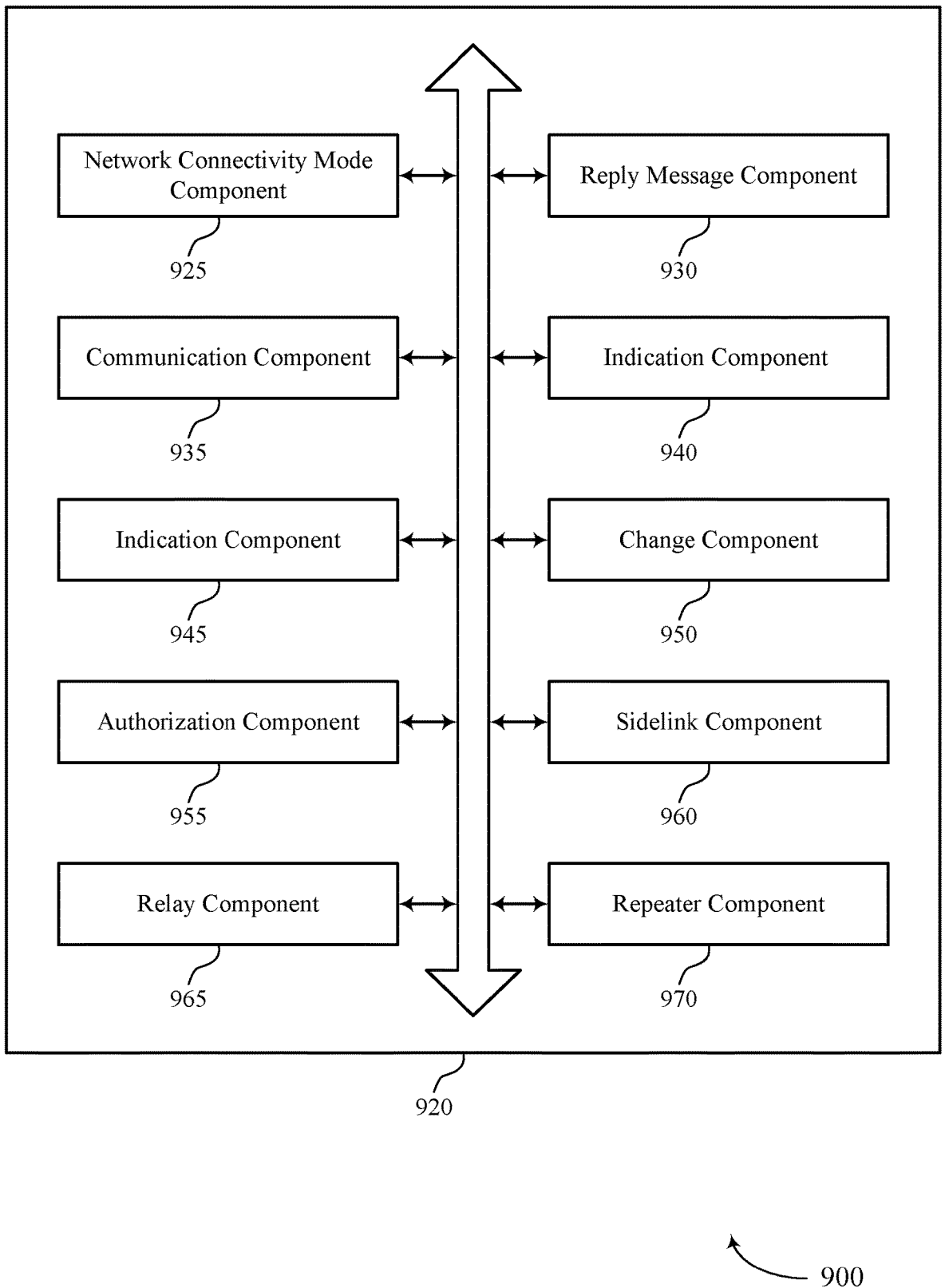
FIG. 9 shows a block diagram of a communications manager that supports mobile IAB connectivity in accordance with one or more aspects of the present disclosure.

FIG. 9 shows a block diagram 900 of a communications manager 920 that supports mobile IAB connectivity in accordance with one or more aspects of the present disclosure. The communications manager 920 may be an example of aspects of a communications manager 720, a communications manager 820, or both, as described herein. The communications manager 920, or various components thereof, may be an example of means for performing various aspects of mobile IAB connectivity as described herein. For example, the communications manager 920 may include a network connectivity mode component 925, a reply message component 930, a communication component 935, an indication component 940, an indication component 945, a change component 950, an authorization component 955, a sidelink component 960, a relay component 965, a repeater component 970, or any combination thereof. Each of these components may communicate, directly or indirectly, with one another (e.g., via one or more buses).

The communications manager 920 may support wireless communication by a mobile wireless node in accordance with examples as disclosed herein. The network connectivity mode component 925 may be configured as or otherwise support a means for transmitting, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The reply message component 930 may be configured as or otherwise support a means for receiving, from the parent wireless node, a reply message indicating authorization to use at least a first network connectivity mode of the one or more network connectivity modes. The communication component 935 may be configured as or otherwise support a means for communicating one or more messages with a first UE of the one or more UEs in accordance with the first network connectivity mode.

In some examples, the indication component 940 may be configured as or otherwise support a means for transmitting, to the one or more UEs, an indication of the first network connectivity mode. In some examples, the indication component 945 may be configured as or otherwise support a means for transmitting, to the parent wireless node, an indication that the mobile wireless node is operating using the first network connectivity mode for communication with the first UE.

In some examples, the change component 950 may be configured as or otherwise support a means for transmitting, to the parent wireless node, a request to change between operating using the first network connectivity mode to a second network connectivity mode of the one or more network connectivity modes. In some examples, the change component 950 may be configured as or otherwise support a means for receiving, from the parent wireless node, an indication to change between operating using the first network connectivity mode to the second network connectivity mode.

In some examples, the authorization component 955 may be configured as or otherwise support a means for receiving, from the parent wireless node, the reply message indicating authorization to use a second network connectivity mode of the one or more network connectivity modes and indicating at least one criterion for changing between operating using the first network connectivity mode and the second network connectivity mode.

In some examples, the change component 950 may be configured as or otherwise support a means for transmitting, to the one or more UEs, an indication of a change between operating using the first network connectivity mode to a second network connectivity mode.

In some examples, the sidelink component 960 may be configured as or otherwise support a means for receiving a capability message indicating that the first UE supports sidelink communication. In some examples, the sidelink component 960 may be configured as or otherwise support a means for transmitting an indication of a sidelink configuration for the first network connectivity mode.

In some examples, the relay component 965 may be configured as or otherwise support a means for receiving, from the parent wireless node, a first grant scheduling transmission of a message to the mobile wireless node, the message associated with the first UE. In some examples, the relay component 965 may be configured as or otherwise support a means for receiving the message based on the first grant. In some examples, the relay component 965 may be configured as or otherwise support a means for transmitting a second grant scheduling transmission of the message to the first UE. In some examples, the relay component 965 may be configured as or otherwise support a means for transmitting, to the first UE, the message based on the second grant.

In some examples, the repeater component 970 may be configured as or otherwise support a means for receiving, from the parent wireless node, a grant scheduling transmission of a message to the mobile wireless node, the message associated with the first UE. In some examples, the repeater component 970 may be configured as or otherwise support a means for relaying the message to the first UE based on the grant.

In some examples, the network connectivity mode component 925 may be configured as or otherwise support a means for communicating with the first UE using the first network connectivity mode, where the first network connectivity mode is selected based on a capability of the first UE, a QoS metric, an RRM measurement, an interference measurement, or any combination thereof.

Figure 10:
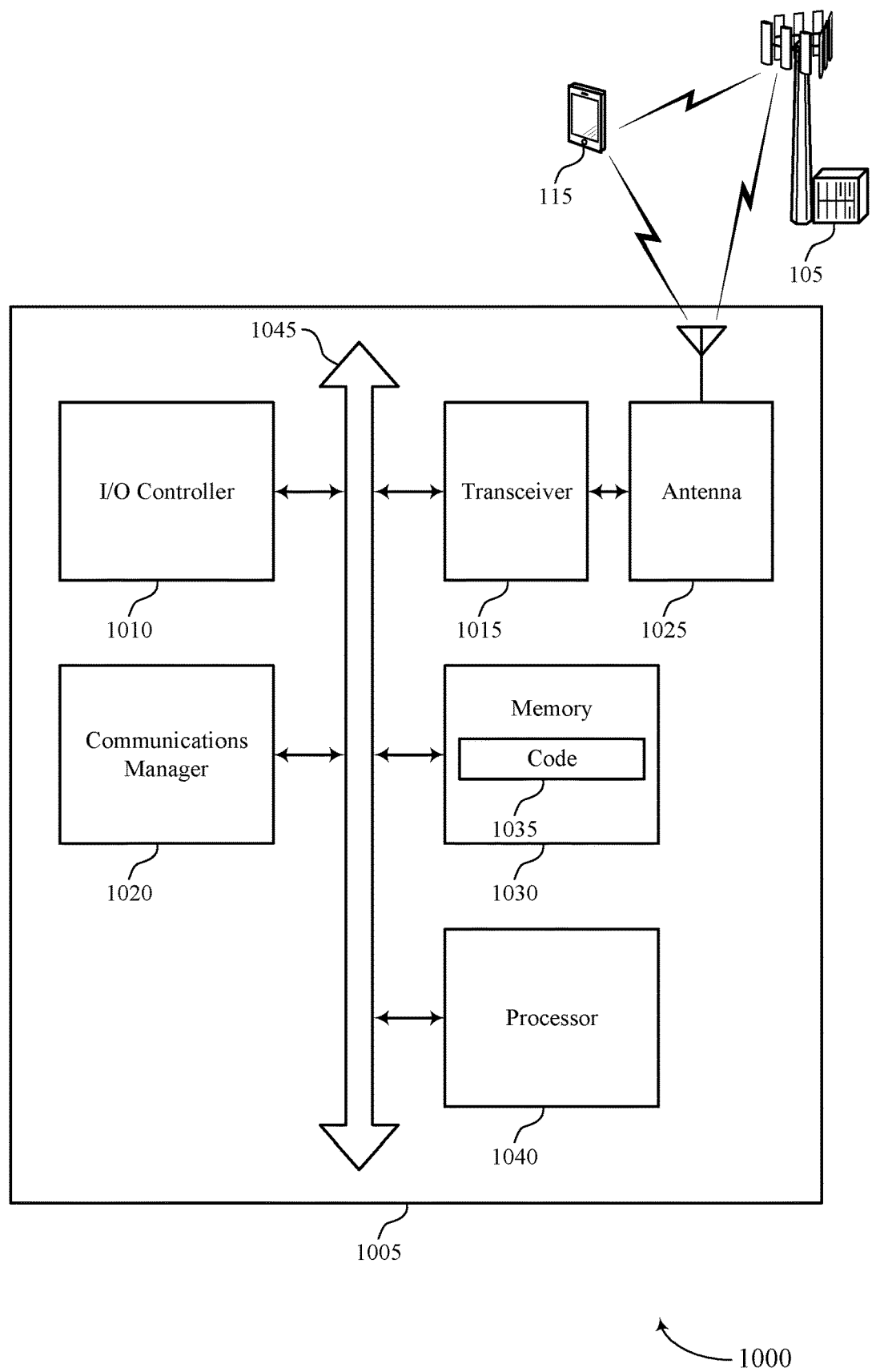
FIG. 10 shows a diagram of a system including a device that supports mobile IAB connectivity in accordance with one or more aspects of the present disclosure.

FIG. 10 shows a diagram of a system 1000 including a device 1005 that supports mobile IAB connectivity in accordance with one or more aspects of the present disclosure. The device 1005 may be an example of or include the components of a device 705, a device 805, or a mobile wireless node as described herein. The device 1005 may include components for bi-directional voice and data communications including components for transmitting and receiving communications, such as a communications manager 1020, an I/O controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting mobile IAB connectivity). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication by a mobile wireless node in accordance with examples as disclosed herein. For example, the communications manager 1020 may be configured as or otherwise support a means for transmitting, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The communications manager 1020 may be configured as or otherwise support a means for receiving, from the parent wireless node, a reply message indicating authorization to use at least a first network connectivity mode of the one or more network connectivity modes. The communications manager 1020 may be configured as or otherwise support a means for communicating one or more messages with a first UE of the one or more UEs in accordance with the first network connectivity mode.

By including or configuring the communications manager 1020 in accordance with examples as described herein, the device 1005 may support techniques for mobile IAB connectivity, which may increase signaling throughput, increase coverage for a mobile IAB node, and improve communications between the mobile IAB node and one or more UEs.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of mobile IAB connectivity as described herein, or the processor 1040 and the memory 1030 may be otherwise configured to perform or support such operations.

Figure 11:
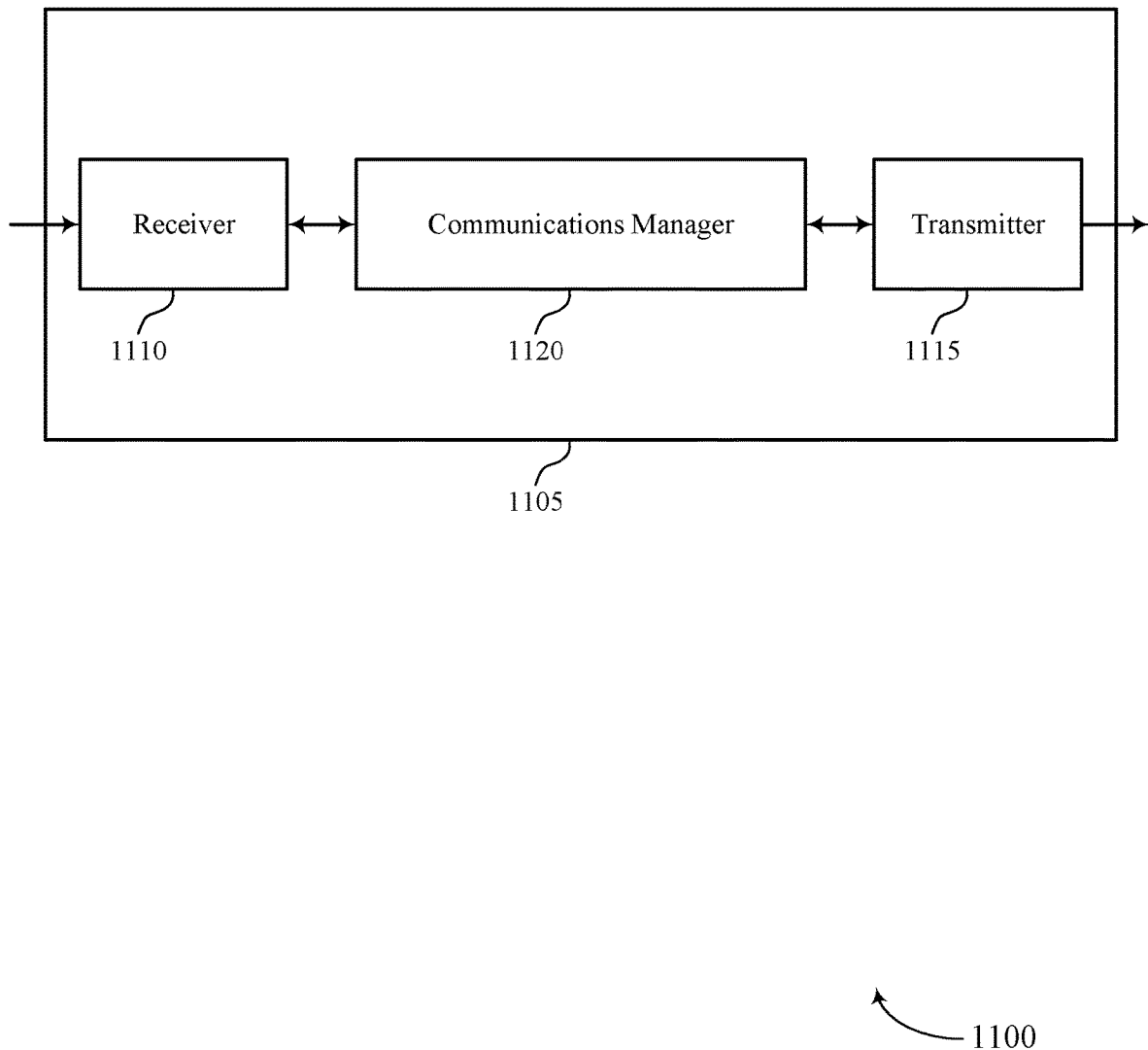
FIGS. 11 and 12 show block diagrams of devices that support mobile IAB connectivity in accordance with one or more aspects of the present disclosure.

FIG. 11 shows a block diagram 1100 of a device 1105 that supports mobile IAB connectivity in accordance with one or more aspects of the present disclosure. The device 1105 may be an example of aspects of a parent wireless node as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of mobile IAB connectivity as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication by a parent wireless node in accordance with examples as disclosed herein. For example, the communications manager 1120 may be configured as or otherwise support a means for receiving, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The communications manager 1120 may be configured as or otherwise support a means for transmitting, to the mobile wireless node, a reply message indicating authorization to use at least a first network connectivity mode of the one or more network connectivity modes.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for mobile IAB connectivity, which may increase signaling throughput, increase coverage for a mobile IAB node, and improve communications between the mobile IAB node and one or more UEs.

Figure 12:
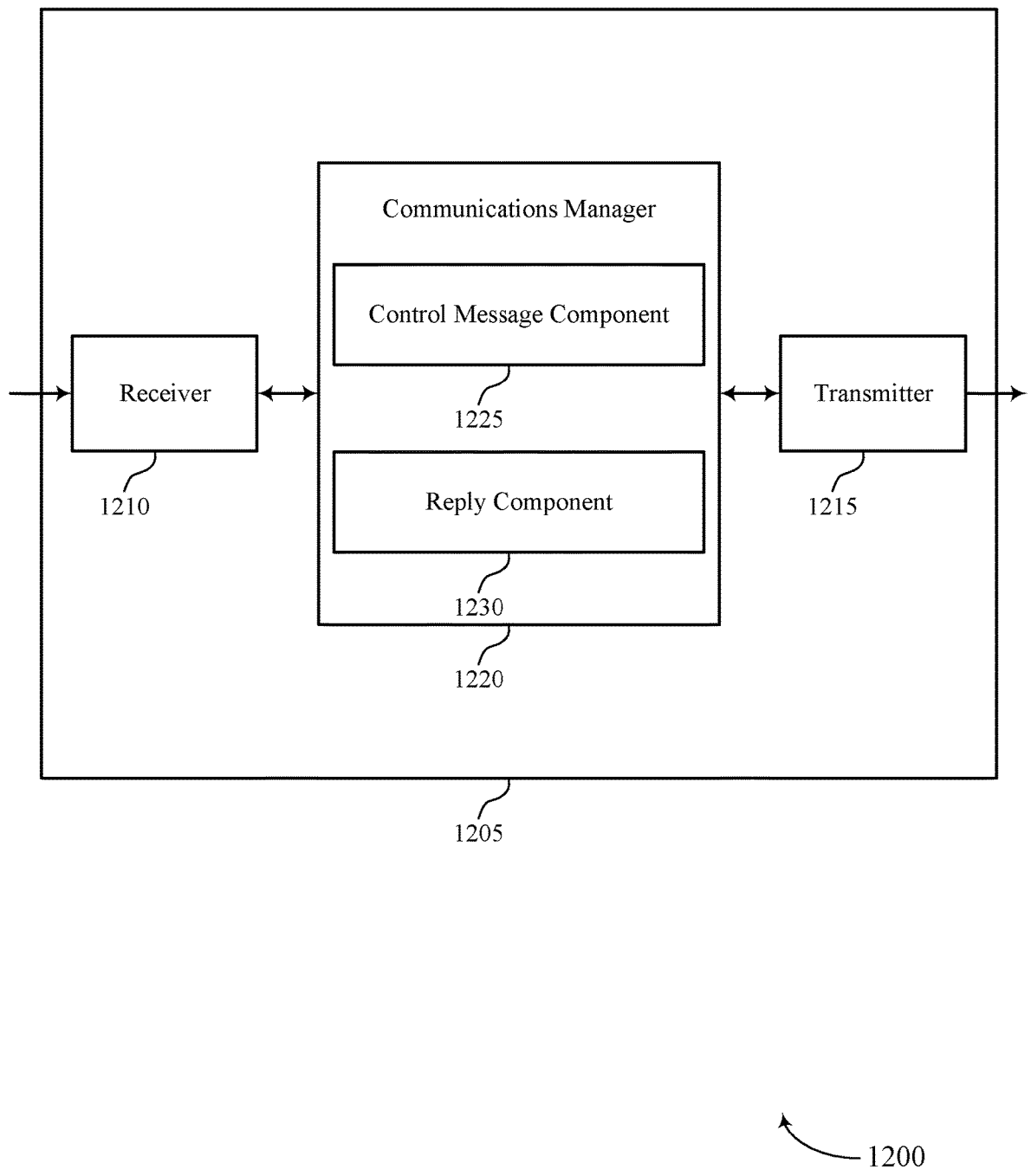

FIG. 12 shows a block diagram 1200 of a device 1205 that supports mobile IAB connectivity in accordance with one or more aspects of the present disclosure. The device 1205 may be an example of aspects of a device 1105 or a parent wireless node 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of mobile IAB connectivity as described herein. For example, the communications manager 1220 may include a control message component 1225 a reply component 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication by a parent wireless node in accordance with examples as disclosed herein. The control message component 1225 may be configured as or otherwise support a means for receiving, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The reply component 1230 may be configured as or otherwise support a means for transmitting, to the mobile wireless node, a reply message indicating authorization to use at least a first network connectivity mode of the one or more network connectivity modes.

Figure 13:
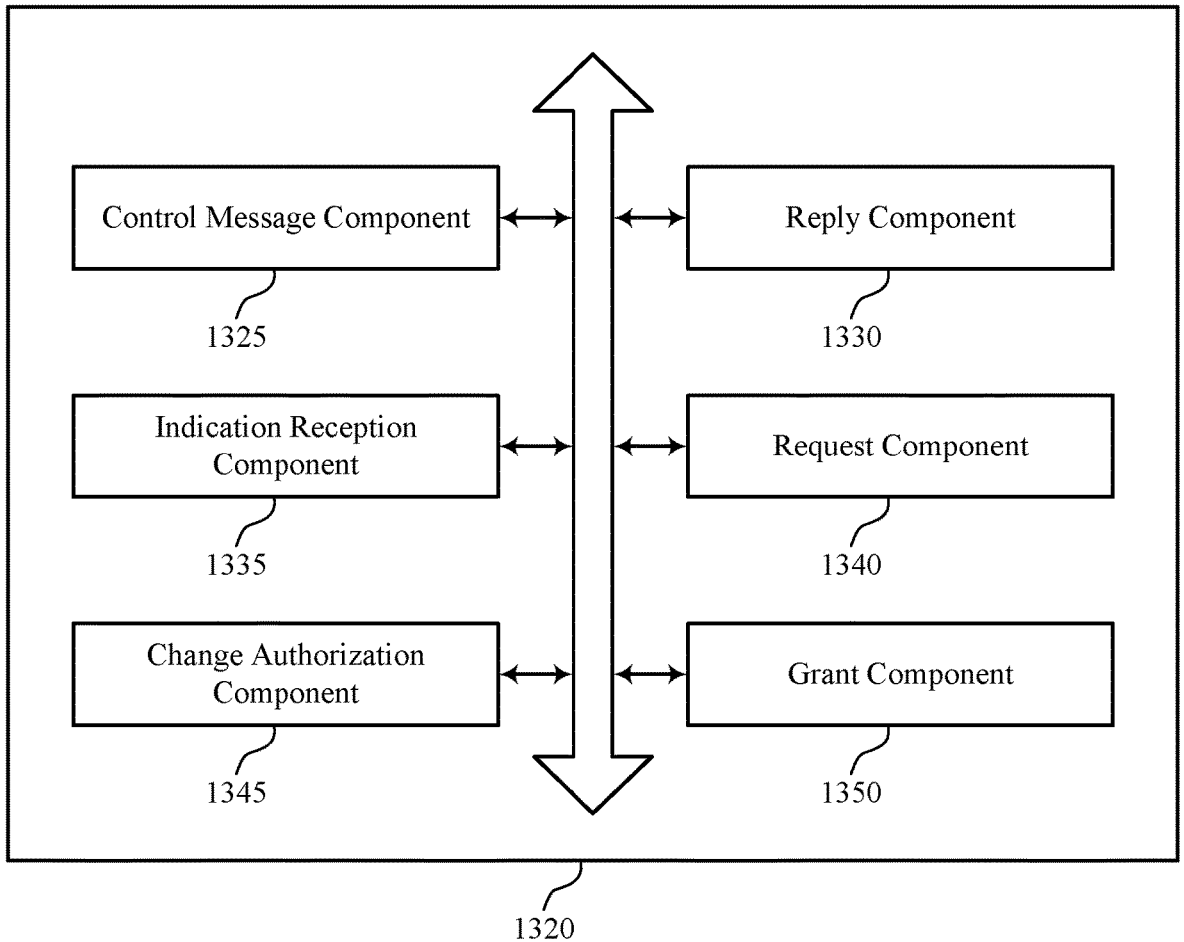
FIG. 13 shows a block diagram of a communications manager that supports mobile IAB connectivity in accordance with one or more aspects of the present disclosure.

FIG. 13 shows a block diagram 1300 of a communications manager 1320 that supports mobile IAB connectivity in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of mobile IAB connectivity as described herein. For example, the communications manager 1320 may include a control message component 1325, a reply component 1330, an indication reception component 1335, a request component 1340, a change authorization component 1345, a grant component 1350, or any combination thereof. Each of these components may communicate, directly or indirectly, with one another (e.g., via one or more buses).

The communications manager 1320 may support wireless communication by a parent wireless node in accordance with examples as disclosed herein. The control message component 1325 may be configured as or otherwise support a means for receiving, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The reply component 1330 may be configured as or otherwise support a means for transmitting, to the mobile wireless node, a reply message indicating authorization to use at least a first network connectivity mode of the one or more network connectivity modes.

In some examples, the indication reception component 1335 may be configured as or otherwise support a means for receiving, from the mobile wireless node, an indication that the mobile wireless node is operating using the first network connectivity mode for communication with a first UE.

In some examples, the request component 1340 may be configured as or otherwise support a means for receiving, from the mobile wireless node, a request to change between operating using the first network connectivity mode to a second network connectivity mode of the one or more network connectivity modes. In some examples, the request component 1340 may be configured as or otherwise support a means for transmitting, to the mobile wireless node, an indication to change between operation using the first network connectivity mode to the second network connectivity mode.

In some examples, the change authorization component 1345 may be configured as or otherwise support a means for transmitting, to the mobile wireless node, the reply message indicating authorization to use a second network connectivity mode of the one or more network connectivity modes and indicating at least one criterion for changing between operating using the first network connectivity mode and the second network connectivity mode.

In some examples, the grant component 1350 may be configured as or otherwise support a means for transmitting, to the mobile wireless node, a first grant scheduling transmission of a message to the mobile wireless node, the message associated with a first UE. In some examples, the grant component 1350 may be configured as or otherwise support a means for transmitting the message based on the first grant.

In some examples, the grant component 1350 may be configured as or otherwise support a means for transmitting, to the mobile wireless node, a grant scheduling transmission of a message to the mobile wireless node, the message associated with a first UE.

Figure 14:
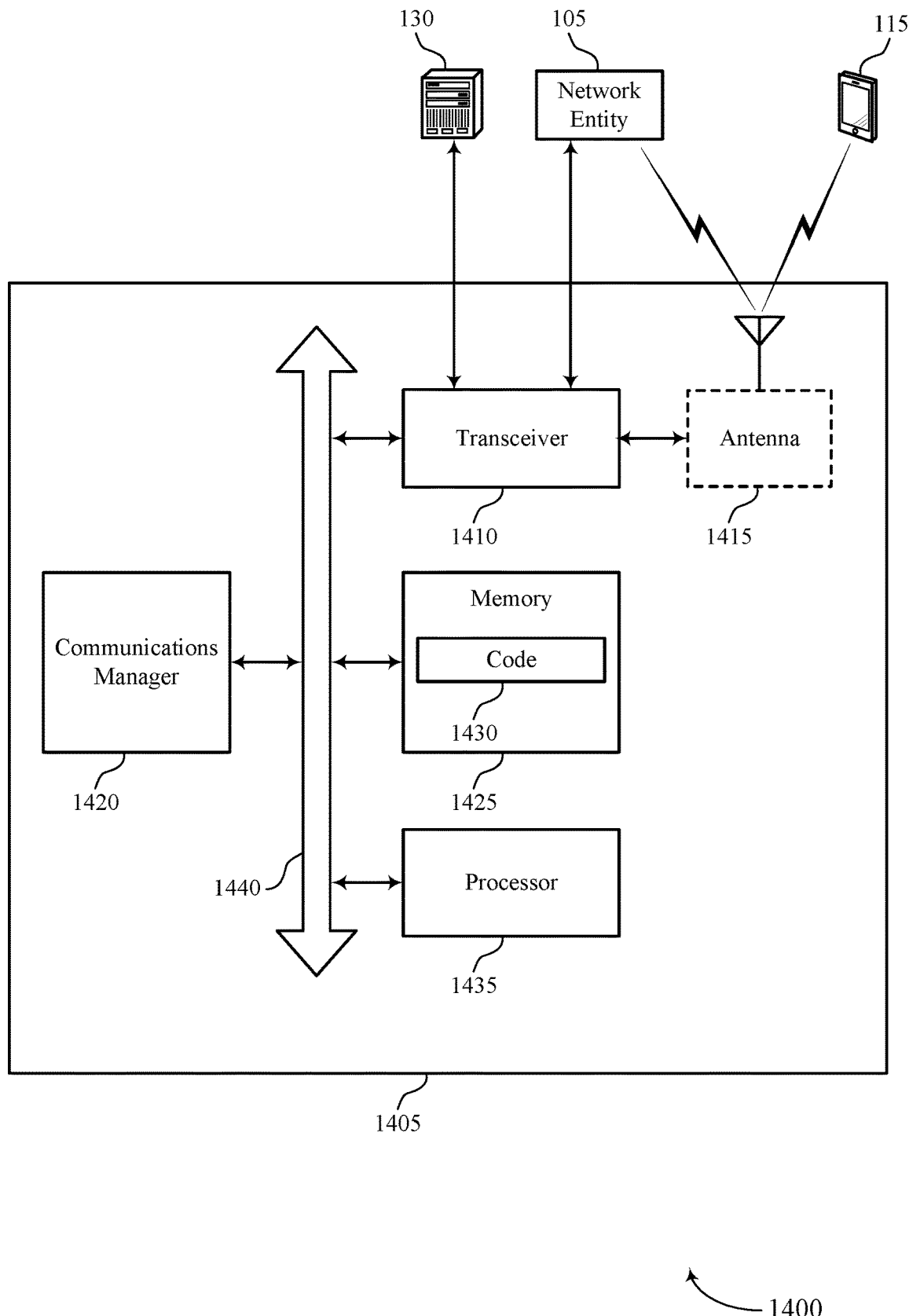
FIG. 14 shows a diagram of a system including a device that supports mobile IAB connectivity in accordance with one or more aspects of the present disclosure.

FIG. 14 shows a diagram of a system 1400 including a device 1405 that supports mobile IAB connectivity in accordance with one or more aspects of the present disclosure. The device 1405 may be an example of or include the components of a device 1105, a device 1205, or a parent wireless node as described herein. The device 1405 may include components for bi-directional voice and data communications including components for transmitting and receiving communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting mobile IAB connectivity). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication by a parent wireless node in accordance with examples as disclosed herein. For example, the communications manager 1420 may be configured as or otherwise support a means for receiving, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The communications manager 1420 may be configured as or otherwise support a means for transmitting, to the mobile wireless node, a reply message indicating authorization to use at least a first network connectivity mode of the one or more network connectivity modes.

By including or configuring the communications manager 1420 in accordance with examples as described herein, the device 1405 may support techniques for mobile IAB connectivity, which may increase signaling throughput, increase coverage for a mobile IAB node, and improve communications between the mobile IAB node and one or more UEs.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of mobile IAB connectivity as described herein, or the processor 1435 and the memory 1425 may be otherwise configured to perform or support such operations.

Figure 15:
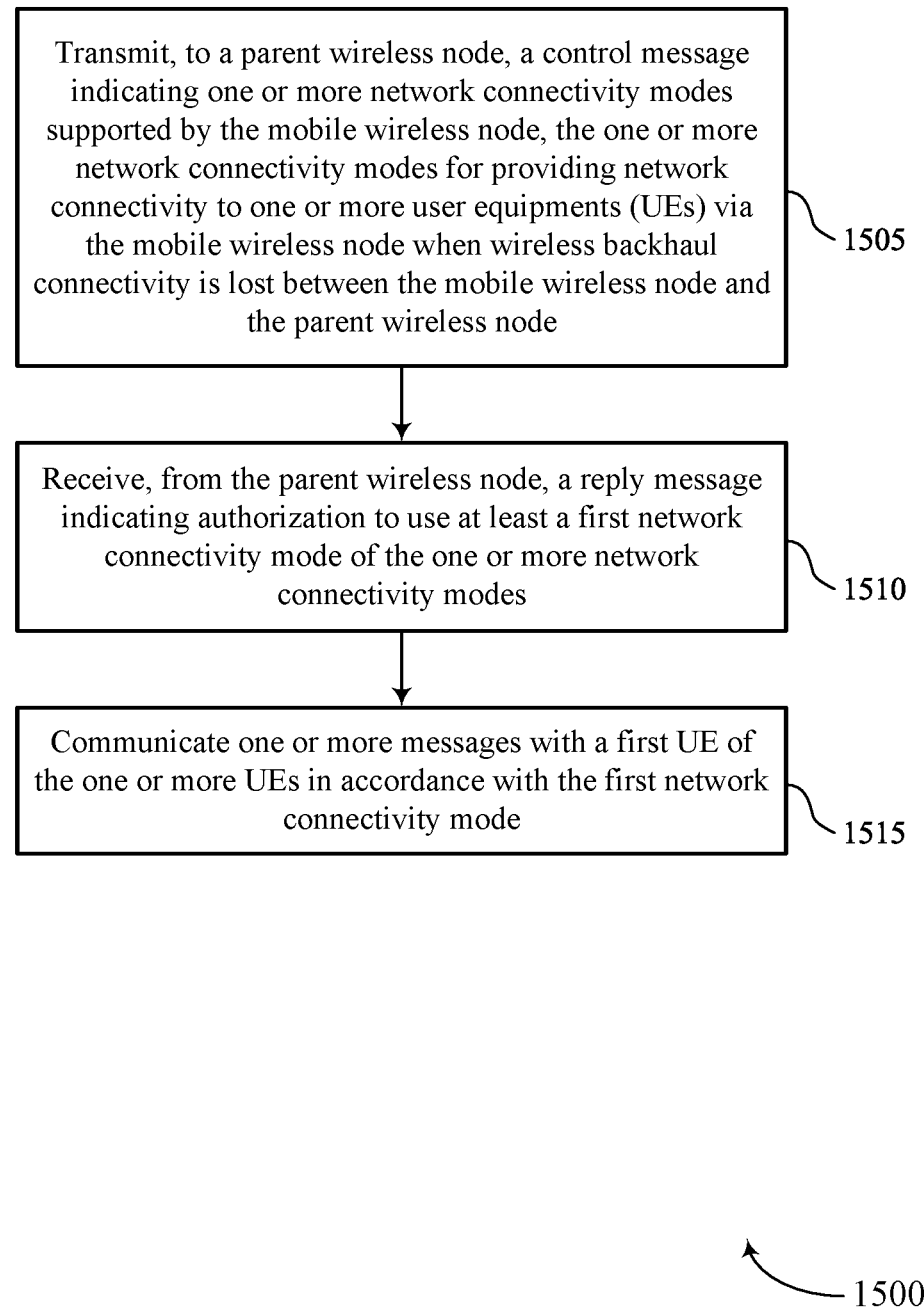
FIGS. 15 through 20 show flowcharts illustrating methods that support mobile IAB connectivity in accordance with one or more aspects of the present disclosure.

FIG. 15 shows a flowchart illustrating a method 1500 that supports mobile IAB connectivity in accordance with one or more aspects of the present disclosure. The operations of the method 1500 may be implemented by a mobile wireless node or its components as described herein. For example, the operations of the method 1500 may be performed by a mobile wireless node as described with reference to FIGS. 1 through 10. In some examples, a mobile wireless node may execute a set of instructions to control the functional elements of the mobile wireless node to perform the described functions. Additionally, or alternatively, the mobile wireless node may perform aspects of the described functions using special-purpose hardware.

At 1505, the method may include transmitting, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The operations of 1505 may be performed in accordance with examples as disclosed herein. In some examples, aspects of the operations of 1505 may be performed by a network connectivity mode component 925 as described with reference to FIG. 9.

At 1510, the method may include receiving, from the parent wireless node, a reply message indicating authorization to use at least a first network connectivity mode of the one or more network connectivity modes. The operations of 1510 may be performed in accordance with examples as disclosed herein. In some examples, aspects of the operations of 1510 may be performed by a reply message component 930 as described with reference to FIG. 9.

At 1515, the method may include communicating one or more messages with a first UE of the one or more UEs in accordance with the first network connectivity mode. The operations of 1515 may be performed in accordance with examples as disclosed herein. In some examples, aspects of the operations of 1515 may be performed by a communication component 935 as described with reference to FIG. 9.

Figure 16:
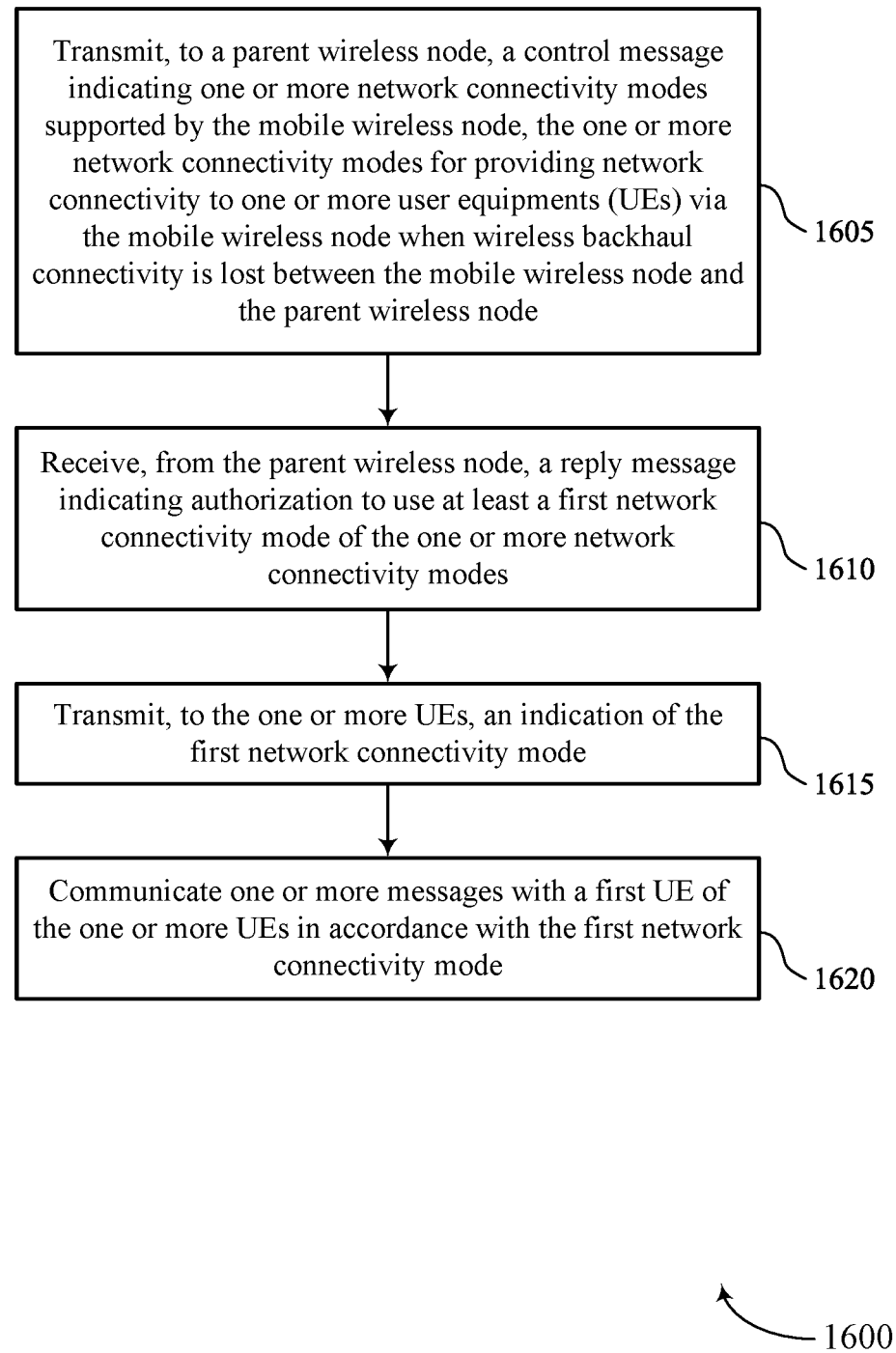

FIG. 16 shows a flowchart illustrating a method 1600 that supports mobile IAB connectivity in accordance with one or more aspects of the present disclosure. The operations of the method 1600 may be implemented by a mobile wireless node or its components as described herein. For example, the operations of the method 1600 may be performed by a mobile wireless node as described with reference to FIGS. 1 through 10. In some examples, a mobile wireless node may execute a set of instructions to control the functional elements of the mobile wireless node to perform the described functions. Additionally, or alternatively, the mobile wireless node may perform aspects of the described functions using special-purpose hardware.

At 1605, the method may include transmitting, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The operations of 1605 may be performed in accordance with examples as disclosed herein. In some examples, aspects of the operations of 1605 may be performed by a network connectivity mode component 925 as described with reference to FIG. 9.

At 1610, the method may include receiving, from the parent wireless node, a reply message indicating authorization to use at least a first network connectivity mode of the one or more network connectivity modes. The operations of 1610 may be performed in accordance with examples as disclosed herein. In some examples, aspects of the operations of 1610 may be performed by a reply message component 930 as described with reference to FIG. 9.

At 1615, the method may include transmitting, to the one or more UEs, an indication of the first network connectivity mode. The operations of 1615 may be performed in accordance with examples as disclosed herein. In some examples, aspects of the operations of 1615 may be performed by an indication component 940 as described with reference to FIG. 9.

At 1620, the method may include communicating one or more messages with a first UE of the one or more UEs in accordance with the first network connectivity mode. The operations of 1620 may be performed in accordance with examples as disclosed herein. In some examples, aspects of the operations of 1620 may be performed by a communication component 935 as described with reference to FIG. 9.

Figure 17:
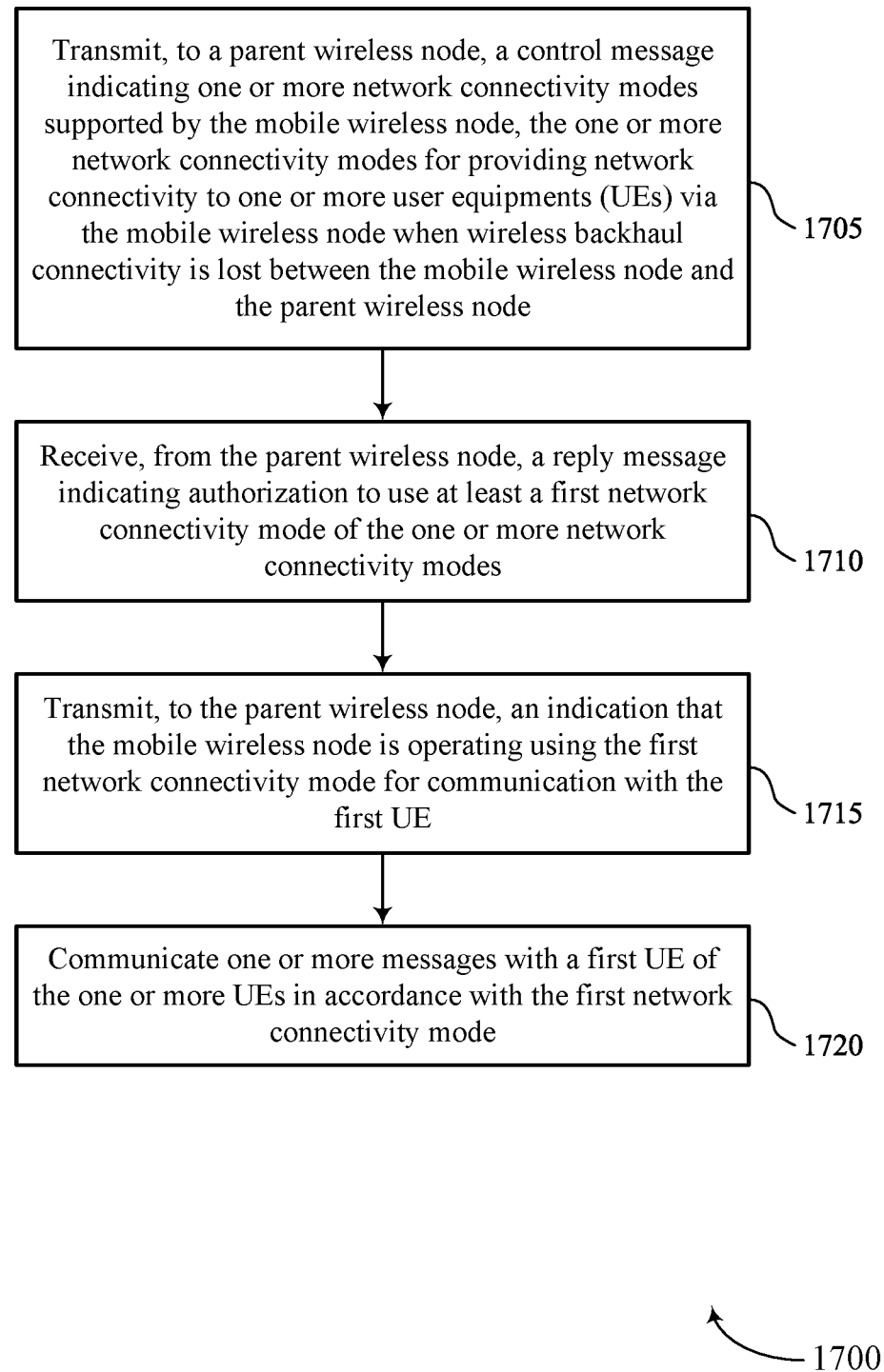

FIG. 17 shows a flowchart illustrating a method 1700 that supports mobile IAB connectivity in accordance with one or more aspects of the present disclosure. The operations of the method 1700 may be implemented by a mobile wireless node or its components as described herein. For example, the operations of the method 1700 may be performed by a mobile wireless node as described with reference to FIGS. 1 through 10. In some examples, a mobile wireless node may execute a set of instructions to control the functional elements of the mobile wireless node to perform the described functions. Additionally, or alternatively, the mobile wireless node may perform aspects of the described functions using special-purpose hardware.

At 1705, the method may include transmitting, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The operations of 1705 may be performed in accordance with examples as disclosed herein. In some examples, aspects of the operations of 1705 may be performed by a network connectivity mode component 925 as described with reference to FIG. 9.

At 1710, the method may include receiving, from the parent wireless node, a reply message indicating authorization to use at least a first network connectivity mode of the one or more network connectivity modes. The operations of 1710 may be performed in accordance with examples as disclosed herein. In some examples, aspects of the operations of 1710 may be performed by a reply message component 930 as described with reference to FIG. 9.

At 1715, the method may include transmitting, to the parent wireless node, an indication that the mobile wireless node is operating using the first network connectivity mode for communication with the first UE. The operations of 1715 may be performed in accordance with examples as disclosed herein. In some examples, aspects of the operations of 1715 may be performed by an indication component 945 as described with reference to FIG. 9.

At 1720, the method may include communicating one or more messages with a first UE of the one or more UEs in accordance with the first network connectivity mode. The operations of 1720 may be performed in accordance with examples as disclosed herein. In some examples, aspects of the operations of 1720 may be performed by a communication component 935 as described with reference to FIG. 9.

Figure 18:
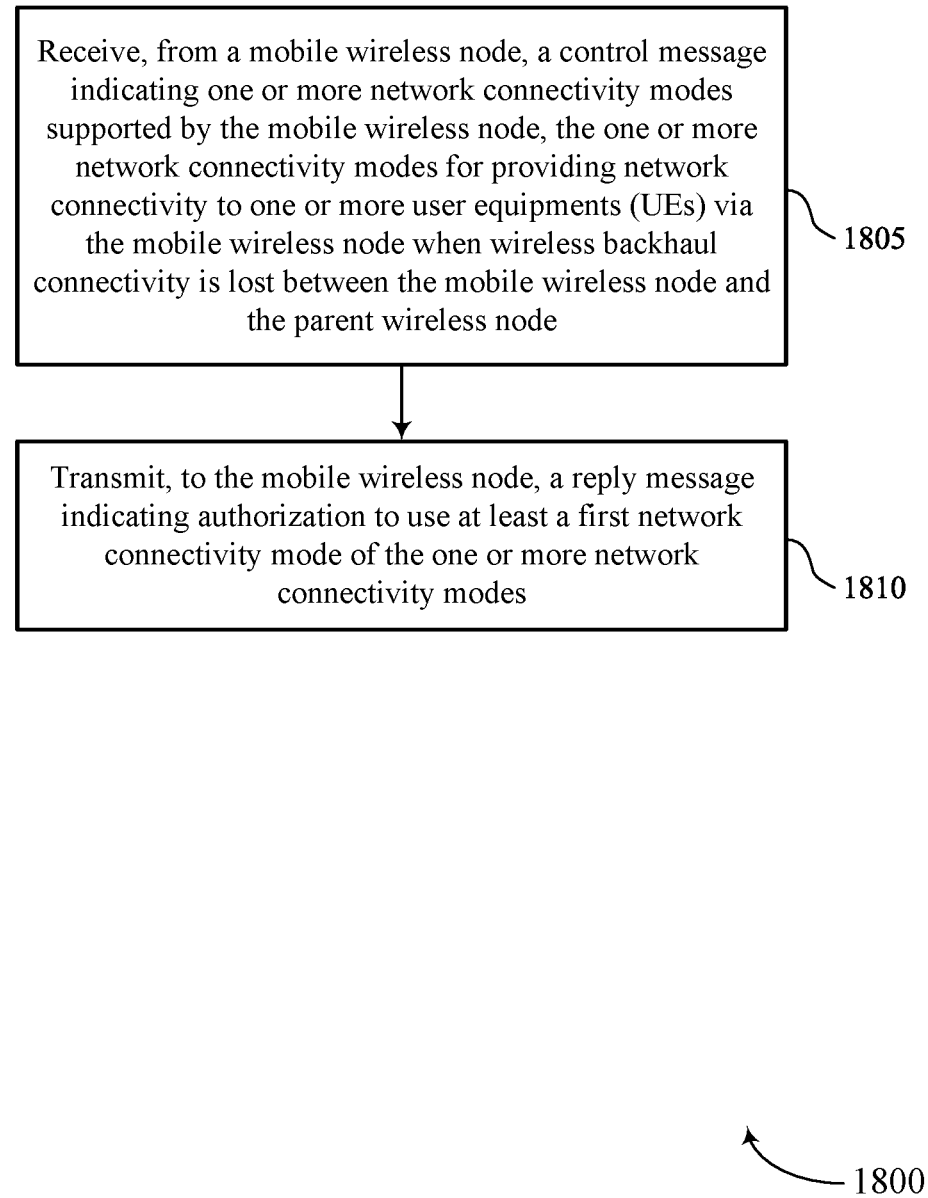

FIG. 18 shows a flowchart illustrating a method 1800 that supports mobile IAB connectivity in accordance with one or more aspects of the present disclosure. The operations of the method 1800 may be performed by a parent wireless node as described with reference to FIGS. 1 through 6 and 11 through 14. In some examples, a parent wireless node may execute a set of instructions to control the functional elements of the parent wireless node to perform the described functions. Additionally, or alternatively, the parent wireless node may perform aspects of the described functions using special-purpose hardware.

At 1805, the method may include receiving, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The operations of 1805 may be performed in accordance with examples as disclosed herein. In some examples, aspects of the operations of 1805 may be performed by a control message component 1325 as described with reference to FIG. 13.

At 1810, the method may include transmitting, to the mobile wireless node, a reply message indicating authorization to use at least a first network connectivity mode of the one or more network connectivity modes. The operations of 1810 may be performed in accordance with examples as disclosed herein. In some examples, aspects of the operations of 1810 may be performed by a reply component 1330 as described with reference to FIG. 13.

Figure 19:
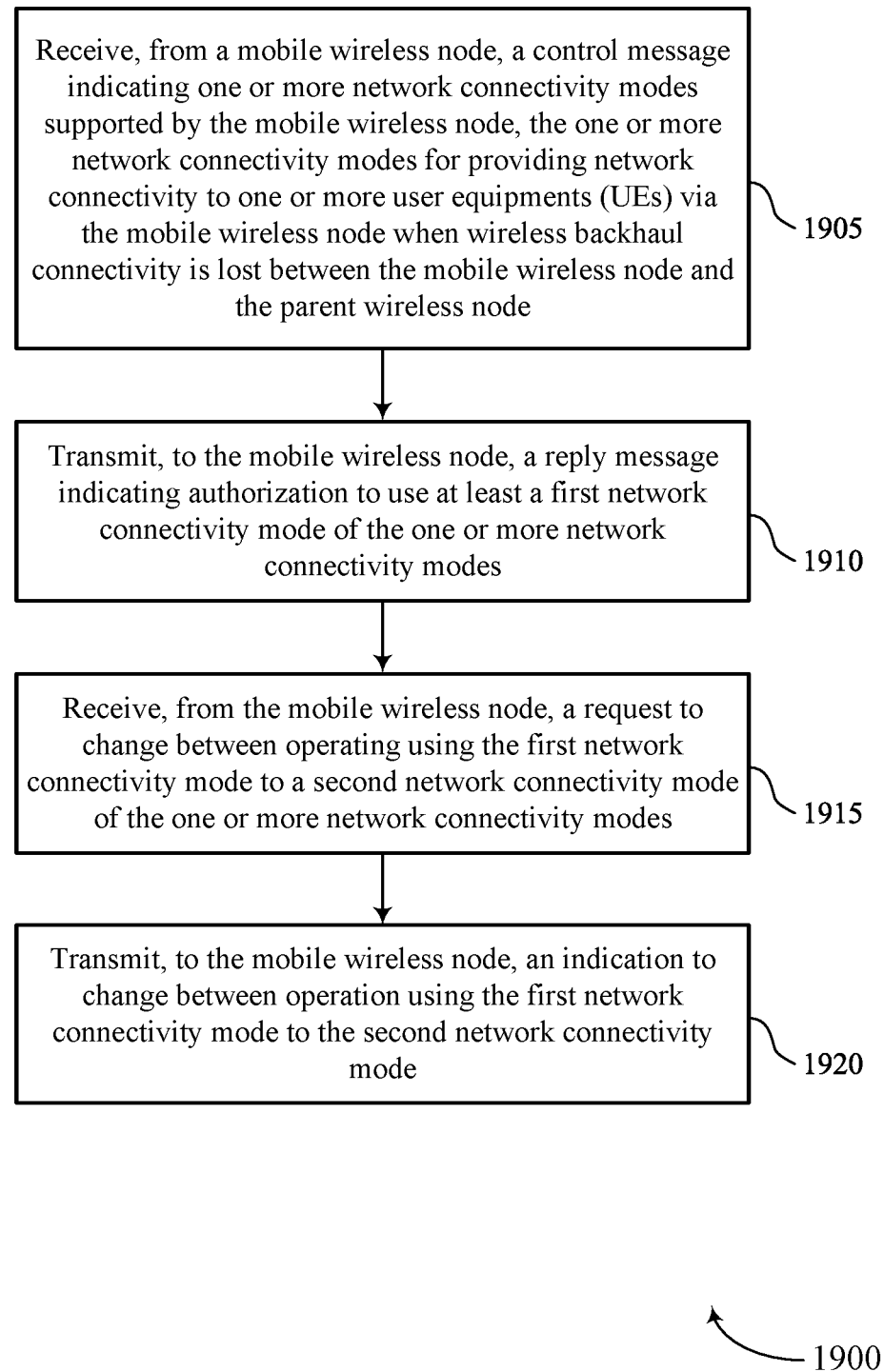

FIG. 19 shows a flowchart illustrating a method 1900 that supports mobile IAB connectivity in accordance with one or more aspects of the present disclosure. The operations of the method 1900 may be implemented by a parent wireless node or its components as described herein. For example, the operations of the method 1900 may be performed by a parent wireless node as described with reference to FIGS. 1 through 6 and 11 through 14. In some examples, a parent wireless node may execute a set of instructions to control the functional elements of the parent wireless node to perform the described functions. Additionally, or alternatively, the parent wireless node may perform aspects of the described functions using special-purpose hardware.

At 1905, the method may include receiving, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The operations of 1905 may be performed in accordance with examples as disclosed herein. In some examples, aspects of the operations of 1905 may be performed by a control message component 1325 as described with reference to FIG. 13.

At 1910, the method may include transmitting, to the mobile wireless node, a reply message indicating authorization to use at least a first network connectivity mode of the one or more network connectivity modes. The operations of 1910 may be performed in accordance with examples as disclosed herein. In some examples, aspects of the operations of 1910 may be performed by a reply component 1330 as described with reference to FIG. 13.

At 1915, the method may include receiving, from the mobile wireless node, a request to change between operating using the first network connectivity mode to a second network connectivity mode of the one or more network connectivity modes. The operations of 1915 may be performed in accordance with examples as disclosed herein. In some examples, aspects of the operations of 1915 may be performed by a request component 1340 as described with reference to FIG. 13.

At 1920, the method may include transmitting, to the mobile wireless node, an indication to change between operation using the first network connectivity mode to the second network connectivity mode. The operations of 1920 may be performed in accordance with examples as disclosed herein. In some examples, aspects of the operations of 1920 may be performed by a request component 1340 as described with reference to FIG. 13.

Figure 20:
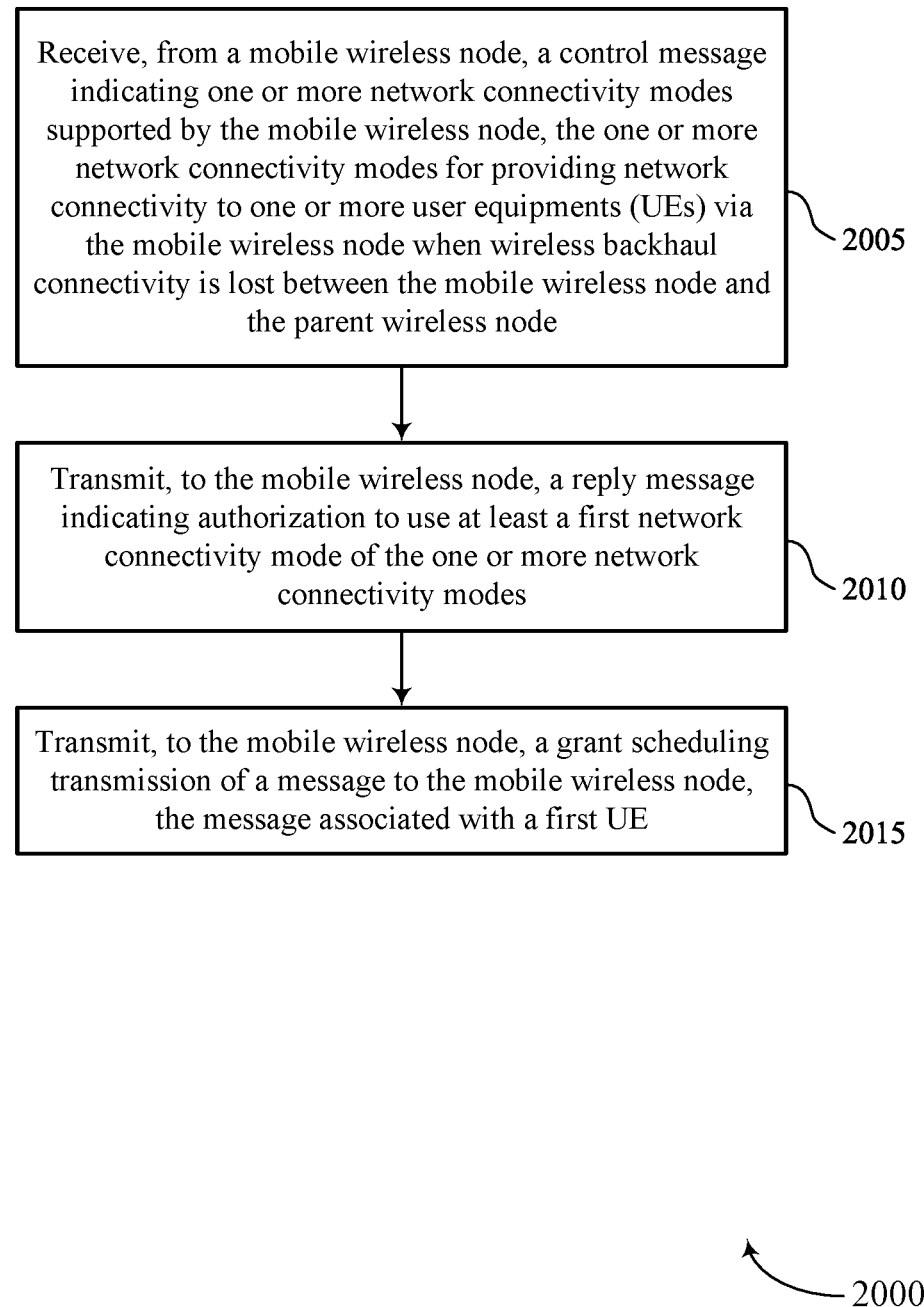

FIG. 20 shows a flowchart illustrating a method 2000 that supports mobile IAB connectivity in accordance with one or more aspects of the present disclosure. The operations of the method 2000 may be implemented by a parent wireless node or its components as described herein. For example, the operations of the method 2000 may be performed by a parent wireless node as described with reference to FIGS. 1 through 6 and 11 through 14. In some examples, a parent wireless node may execute a set of instructions to control the functional elements of the parent wireless node to perform the described functions. Additionally, or alternatively, the parent wireless node may perform aspects of the described functions using special-purpose hardware.

At 2005, the method may include receiving, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The operations of 2005 may be performed in accordance with examples as disclosed herein. In some examples, aspects of the operations of 2005 may be performed by a control message component 1325 as described with reference to FIG. 13.

At 2010, the method may include transmitting, to the mobile wireless node, a reply message indicating authorization to use at least a first network connectivity mode of the one or more network connectivity modes. The operations of 2010 may be performed in accordance with examples as disclosed herein. In some examples, aspects of the operations of 2010 may be performed by a reply component 1330 as described with reference to FIG. 13.

At 2015, the method may include transmitting, to the mobile wireless node, a grant scheduling transmission of a message to the mobile wireless node, the message associated with a first UE. The operations of 2015 may be performed in accordance with examples as disclosed herein. In some examples, aspects of the operations of 2015 may be performed by a grant component 1350 as described with reference to FIG. 13.

The following provides an overview of aspects of the present disclosure:

Aspect 1: A method for wireless communication by a mobile wireless node, comprising: transmitting, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node; receiving, from the parent wireless node, a reply message indicating authorization to use at least a first network connectivity mode of the one or more network connectivity modes; and communicating one or more messages with a first UE of the one or more UEs in accordance with the first network connectivity mode.

Aspect 2: The method of aspect 1, further comprising: transmitting, to the one or more UEs, an indication of the first network connectivity mode.

Aspect 3: The method of any of aspects 1 through 2, further comprising: transmitting, to the parent wireless node, an indication that the mobile wireless node is operating using the first network connectivity mode for communication with the first UE.

Aspect 4: The method of any of aspects 1 through 3, further comprising: transmitting, to the parent wireless node, a request to change between operating using the first network connectivity mode to a second network connectivity mode of the one or more network connectivity modes; and receiving, from the parent wireless node, an indication to change between operating using the first network connectivity mode to the second network connectivity mode.

Aspect 5: The method of any of aspects 1 through 4, further comprising: receiving, from the parent wireless node, the reply message indicating authorization to use a second network connectivity mode of the one or more network connectivity modes and indicating at least one criterion for changing between operating using the first network connectivity mode and the second network connectivity mode.

Aspect 6: The method of any of aspects 1 through 5, further comprising: transmitting, to the one or more UEs, an indication of a change between operating using the first network connectivity mode to a second network connectivity mode.

Aspect 7: The method of any of aspects 1 through 6, further comprising: receiving a capability message indicating that the first UE supports sidelink communication; and transmitting an indication of a sidelink configuration for the first network connectivity mode.

Aspect 8: The method of any of aspects 1 through 7, further comprising: receiving, from the parent wireless node, a first grant scheduling transmission of a message to the mobile wireless node, the message associated with the first UE; receiving the message based at least in part on the first grant; transmitting a second grant scheduling transmission of the message to the first UE; and transmitting, to the first UE, the message based at least in part on the second grant.

Aspect 9: The method of any of aspects 1 through 8, further comprising: receiving, from the parent wireless node, a grant scheduling transmission of a message to the mobile wireless node, the message associated with the first UE; and relaying the message to the first UE based at least in part on the grant.

Aspect 10: The method of any of aspects 1 through 9, further comprising: communicating with the first UE using the first network connectivity mode, wherein the first network connectivity mode is selected based at least in part on a capability of the first UE, a QoS metric, an RRM measurement, an interference measurement, or any combination thereof.

Aspect 11: A method for wireless communication by a parent wireless node, comprising: receiving, from a mobile wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node; and transmitting, to the mobile wireless node, a reply message indicating authorization to use at least a first network connectivity mode of the one or more network connectivity modes.

Aspect 12: The method of aspect 11, further comprising: receiving, from the mobile wireless node, an indication that the mobile wireless node is operating using the first network connectivity mode for communication with a first UE.

Aspect 13: The method of any of aspects 11 through 12, further comprising: receiving, from the mobile wireless node, a request to change between operating using the first network connectivity mode to a second network connectivity mode of the one or more network connectivity modes; and transmitting, to the mobile wireless node, an indication to change between operation using the first network connectivity mode to the second network connectivity mode.

Aspect 14: The method of any of aspects 11 through 13, further comprising: transmitting, to the mobile wireless node, the reply message indicating authorization to use a second network connectivity mode of the one or more network connectivity modes and indicating at least one criterion for changing between operating using the first network connectivity mode and the second network connectivity mode.

Aspect 15: The method of any of aspects 11 through 14, further comprising: transmitting, to the mobile wireless node, a first grant scheduling transmission of a message to the mobile wireless node, the message associated with a first UE; and transmitting the message based at least in part on the first grant.

Aspect 16: The method of any of aspects 11 through 15, further comprising: transmitting, to the mobile wireless node, a grant scheduling transmission of a message to the mobile wireless node, the message associated with a first UE.

Aspect 17: An apparatus for wireless communication by a mobile wireless node, comprising a processor; memory coupled with the processor; and instructions stored in the memory and executable by the processor to cause the apparatus to perform a method of any of aspects 1 through 10.

Aspect 18: An apparatus for wireless communication by a mobile wireless node, comprising at least one means for performing a method of any of aspects 1 through 10.

Aspect 19: A non-transitory computer-readable medium storing code for wireless communication by a mobile wireless node, the code comprising instructions executable by a processor to perform a method of any of aspects 1 through 10.

Aspect 20: An apparatus for wireless communication by a parent wireless node, comprising a processor; memory coupled with the processor; and instructions stored in the memory and executable by the processor to cause the apparatus to perform a method of any of aspects 11 through 16.

Aspect 21: An apparatus for wireless communication by a parent wireless node, comprising at least one means for performing a method of any of aspects 11 through 16.

Aspect 22: A non-transitory computer-readable medium storing code for wireless communication by a parent wireless node, the code comprising instructions executable by a processor to perform a method of any of aspects 11 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication by a mobile wireless node, comprising:
one or more processors;
one or more memories coupled with the one or more processors; and
instructions stored in the one or more memories and executable by the one or more processors to cause the apparatus to:
transmit, to a parent wireless node, a control message indicating one or more network connectivity modes supported by the mobile wireless node, the one or more network connectivity modes comprising a relaying mode of operation or a repeater mode of operation for providing network connectivity to one or more user equipments (UEs) via the mobile wireless node when wireless backhaul connectivity is lost between the mobile wireless node and the parent wireless node;
receive, from the parent wireless node and before loss of the wireless backhaul connectivity, a reply message indicating authorization to use at least a first network connectivity mode of the one or more network connectivity modes; and
communicate one or more messages with a first UE of the one or more UEs in accordance with the first network connectivity mode when the wireless backhaul connectivity is lost.

2. The apparatus of claim 1, wherein the instructions are further executable by the one or more processors to cause the apparatus to:
transmit, to the one or more UEs, an indication of the first network connectivity mode.

3. The apparatus of claim 1, wherein the instructions are further executable by the one or more processors to cause the apparatus to:
transmit, to the parent wireless node, an indication that the mobile wireless node is operating using the first network connectivity mode for communication with the first UE.

4. The apparatus of claim 1, wherein the instructions are further executable by the one or more processors to cause the apparatus to:
transmit, to the parent wireless node, a request to change between operating using the first network connectivity mode to a second network connectivity mode of the one or more network connectivity modes; and
receive, from the parent wireless node, an indication to change between operating using the first network connectivity mode to the second network connectivity mode.

5. The apparatus of claim 1, wherein the instructions are further executable by the one or more processors to cause the apparatus to:
receive, from the parent wireless node, the reply message indicating authorization to use a second network connectivity mode of the one or more network connectivity modes and indicating at least one criterion for changing between operating using the first network connectivity mode and the second network connectivity mode.

6. The apparatus of claim 1, wherein the instructions are further executable by the one or more processors to cause the apparatus to:
transmit, to the one or more UEs, an indication of a change between operating using the first network connectivity mode to a second network connectivity mode.

7. The apparatus of claim 1, wherein the instructions are further executable by the one or more processors to cause the apparatus to:
receive a capability message indicating that the first UE supports sidelink communication; and
transmit an indication of a sidelink configuration for the first network connectivity mode.

8. The apparatus of claim 1, wherein the instructions are further executable by the one or more processors to cause the apparatus to:
receive, from the parent wireless node, a first grant scheduling transmission of a message to the mobile wireless node, the message associated with the first UE;
receive the message based at least in part on the first grant;
transmit a second grant scheduling transmission of the message to the first UE; and
transmit, to the first UE, the message based at least in part on the second grant.

9. The apparatus of claim 1, wherein the instructions are further executable by the one or more processors to cause the apparatus to:
receive, from the parent wireless node, a grant scheduling transmission of a message to the mobile wireless node, the message associated with the first UE; and
relay the message to the first UE based at least in part on the grant.

10. The apparatus of claim 1, wherein the instructions are further executable by the one or more processors to cause the apparatus to:
communicate with the first UE using the first network connectivity mode,
wherein the first network connectivity mode is selected based at least in part on a capability of the first UE, a quality of service metric, a radio resource management measurement, an interference measurement, or any combination thereof.

11. An apparatus for wireless communication by a parent wireless node, comprising:
one or more processors;
one or more memories coupled with the one or more processors; and
instructions stored in the one or more memories and executable by the one or more processors to cause the apparatus to:
receive, from a mobile wireless node, a control message indicating one or more network connectivity modes supported by the mobile wireless node, the one or more network connectivity modes comprising a relaying mode of operation or a repeater mode of operation for providing network connectivity to one or more user equipments (UEs) via the mobile wireless node when wireless backhaul connectivity is lost between the mobile wireless node and the parent wireless node; and
transmit, to the mobile wireless node before loss of the wireless backhaul connectivity, a reply message indicating authorization to use at least a first network connectivity mode of the one or more network connectivity modes when the wireless backhaul connectivity is lost.

12. The apparatus of claim 11, wherein the instructions are further executable by the one or more processors to cause the apparatus to:

receive, from the mobile wireless node, an indication that the mobile wireless node is operating using the first network connectivity mode for communication with a first UE.

13. The apparatus of claim 11, wherein the instructions are further executable by the one or more processors to cause the apparatus to:
receive, from the mobile wireless node, a request to change between operating using the first network connectivity mode to a second network connectivity mode of the one or more network connectivity modes; and
transmit, to the mobile wireless node, an indication to change between operation using the first network connectivity mode to the second network connectivity mode.

14. The apparatus of claim 11, wherein the instructions are further executable by the one or more processors to cause the apparatus to:
transmit, to the mobile wireless node, the reply message indicating authorization to use a second network connectivity mode of the one or more network connectivity modes and indicating at least one criterion for changing between operating using the first network connectivity mode and the second network connectivity mode.

15. The apparatus of claim 11, wherein the instructions are further executable by the one or more processors to cause the apparatus to:
transmit, to the mobile wireless node, a first grant scheduling transmission of a message to the mobile wireless node, the message associated with a first UE; and
transmit the message based at least in part on the first grant.

16. The apparatus of claim 11, wherein the instructions are further executable by the one or more processors to cause the apparatus to:
transmit, to the mobile wireless node, a grant scheduling transmission of a message to the mobile wireless node, the message associated with a first UE.

17. A method for wireless communication by a mobile wireless node, comprising:
transmitting, to a parent wireless node, a control message indicating one or more network connectivity modes supported by the mobile wireless node, the one or more network connectivity modes comprising a relaying mode of operation or a repeater mode of operation for providing network connectivity to one or more user equipments (UEs) via the mobile wireless node when wireless backhaul connectivity is lost between the mobile wireless node and the parent wireless node;
receiving, from the parent wireless node and before loss of the wireless backhaul connectivity, a reply message indicating authorization to use at least a first network connectivity mode of the one or more network connectivity modes; and
communicating one or more messages with a first UE of the one or more UEs in accordance with the first network connectivity mode when the wireless backhaul connectivity is lost.

18. The method of claim 17, further comprising:
transmitting, to the one or more UEs, an indication of the first network connectivity mode.

19. The method of claim 17, further comprising:
transmitting, to the parent wireless node, an indication that the mobile wireless node is operating using the first network connectivity mode for communication with the first UE.

20. The method of claim 17, further comprising:
transmitting, to the parent wireless node, a request to change between operating using the first network connectivity mode to a second network connectivity mode of the one or more network connectivity modes; and
receiving, from the parent wireless node, an indication to change between operating using the first network connectivity mode to the second network connectivity mode.

21. The method of claim 17, further comprising:
receiving, from the parent wireless node, the reply message indicating authorization to use a second network connectivity mode of the one or more network connectivity modes and indicating at least one criterion for changing between operating using the first network connectivity mode and the second network connectivity mode.

22. The method of claim 17, further comprising:
transmitting, to the one or more UEs, an indication of a change between operating using the first network connectivity mode to a second network connectivity mode.

23. The method of claim 17, further comprising:
receiving a capability message indicating that the first UE supports sidelink communication; and
transmitting an indication of a sidelink configuration for the first network connectivity mode.

24. The method of claim 17, further comprising:
receiving, from the parent wireless node, a first grant scheduling transmission of a message to the mobile wireless node, the message associated with the first UE;
receiving the message based at least in part on the first grant;
transmitting a second grant scheduling transmission of the message to the first UE; and
transmitting, to the first UE, the message based at least in part on the second grant.

25. The method of claim 17, further comprising:
receiving, from the parent wireless node, a grant scheduling transmission of a message to the mobile wireless node, the message associated with the first UE; and
relaying the message to the first UE based at least in part on the grant.

26. The method of claim 17, further comprising:
communicating with the first UE using the first network connectivity mode,
wherein the first network connectivity mode is selected based at least in part on a capability of the first UE, a quality of service metric, a radio resource management measurement, an interference measurement, or any combination thereof.

27. A method for wireless communication by a parent wireless node, comprising:
receiving, from a mobile wireless node, a control message indicating one or more network connectivity modes supported by the mobile wireless node, the one or more network connectivity modes comprising a relaying mode of operation or a repeater mode of operation for providing network connectivity to one or more user equipments (UEs) via the mobile wireless node when wireless backhaul connectivity is lost between the mobile wireless node and the parent wireless node; and
transmitting, to the mobile wireless node before loss of the wireless backhaul connectivity, a reply message indicating authorization to use at least a first network connectivity mode of the one or more network connectivity modes when the wireless backhaul connectivity is lost.

28. The method of claim 27, further comprising:
receiving, from the mobile wireless node, an indication that the mobile wireless node is operating using the first network connectivity mode for communication with a first UE.

29. The method of claim 27, further comprising:
receiving, from the mobile wireless node, a request to change between operating using the first network connectivity mode to a second network connectivity mode of the one or more network connectivity modes; and
transmitting, to the mobile wireless node, an indication to change between operation using the first network connectivity mode to the second network connectivity mode.

30. The method of claim 27, further comprising:
transmitting, to the mobile wireless node, the reply message indicating authorization to use a second network connectivity mode of the one or more network connectivity modes and indicating at least one criterion for changing between operating using the first network connectivity mode and the second network connectivity mode.

* * * * *